United States Patent
Chen et al.

(10) Patent No.: US 9,377,959 B2
(45) Date of Patent: Jun. 28, 2016

(54) DATA STORAGE METHOD AND APPARATUS

(71) Applicant: TENCENT TECHNOLOGY (SHENZHEN) COMPANY LIMITED, Shenzhen, Guangdong Province (CN)

(72) Inventors: Zheng Chen, Shenzhen (CN); Dafu Deng, Shenzhen (CN)

(73) Assignee: TENCENT TECHNOLOGY (SHENZHEN) COMPANY LIMITED, Shenzhen, Guangdong (KR)

( * ) Notice: Subject to any disclaimer, the term of this patent is extended or adjusted under 35 U.S.C. 154(b) by 0 days.

(21) Appl. No.: 14/652,002

(22) PCT Filed: Dec. 2, 2013

(86) PCT No.: PCT/CN2013/088286
§ 371 (c)(1),
(2) Date: Jun. 12, 2015

(87) PCT Pub. No.: WO2014/090097
PCT Pub. Date: Jun. 19, 2014

(65) Prior Publication Data
US 2015/0331619 A1   Nov. 19, 2015

(30) Foreign Application Priority Data
Dec. 14, 2012  (CN) .......................... 2012 1 0541207

(51) Int. Cl.
*G06F 17/30* (2006.01)
*G06F 3/06* (2006.01)

(52) U.S. Cl.
CPC .............. *G06F 3/0613* (2013.01); *G06F 3/064* (2013.01); *G06F 3/0679* (2013.01); *G06F 17/30* (2013.01); *G06F 17/3033* (2013.01); *G06F 17/30371* (2013.01)

(58) Field of Classification Search
CPC ............. G06F 17/30; G06F 3/06; G06F 3/00; G06F 17/30501; G06F 17/30454; G06F 17/30492; G06F 12/00; G06F 13/00; G06F 3/0613; G06F 17/30371; G06F 3/0679; G06F 17/3033; G06F 3/064; H03M 7/42; H03M 7/30

See application file for complete search history.

(56) References Cited

U.S. PATENT DOCUMENTS

2006/0020603 A1   1/2006   Lo Turco et al.

FOREIGN PATENT DOCUMENTS

| CN | 1564991 A   | 1/2005  |
| CN | 101777056 A | 7/2010  |
| CN | 102223289 A | 10/2011 |

OTHER PUBLICATIONS

International Preliminary Report for Application No. PCT/CN2013/088286 dated Jun. 25, 2015.
Chang, F., J. Dean, S. Ghemawat, W. C. Hsieh, D. A. Wallach, "Bigtable: A Distributed Storage System for Structured Data" Google, Inc.
International Search report for PCT/CN2013/088286, ISA/CN, mailed Feb. 27, 2014.

*Primary Examiner* — Jared Rutz
*Assistant Examiner* — Jean Edouard
(74) *Attorney, Agent, or Firm* — Harness, Dickey & Pierce, P.L.C.

(57) ABSTRACT

Implementation manners of the present invention provide a data storage method and apparatus. A fixed-length key and a value thereof are stored into a first data block, where the storing a fixed-length key includes: uniformly storing a common prefix of each fixed-length key, and separately storing a remainder part of each fixed-length key after the common prefix is removed; and a variable-length key and a length thereof are stored into a second data block, where the storing a variable-length key includes: storing a variable-length key of a base-key type in a full storage manner, and performing prefix compression on a variable-length key of a prefix-compressed key type.

18 Claims, 11 Drawing Sheets

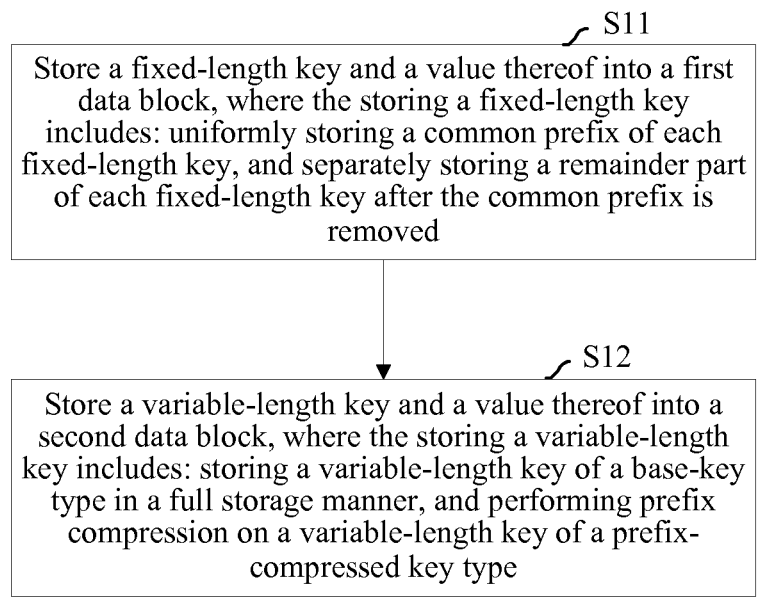

Temporarily-allocated area

| |
|---|
| KV type |
| Compression type |
| A length of a fixed-length key |
| A length of fixed-length data |
| Threshold length |
| Threshold difference |
| Sstable ID |
| In memory type |
| Table No |
| Lg ID |
| The number of records |
| A length before compression |
| A length after compression |
| A size of a data block |
| A length of an index block after compression |
| A length of an index block before compression |
| An offset of an index block |
| A bloom filter offset |
| A bloom filter length |
| The number of hash of a bloom filter |
| A collision probability of a bloom filter |
| Creation timestamp |
| The number of rows |
| The number of cells |

DATA STORAGE METHOD AND APPARATUS

RELATED APPLICATION

This application is a 371 U.S. National Phase of PCT/CN2013/088286, filed on Dec. 2, 2013, which claims priority to Chinese Patent Application No. 201210541207.0, filed with the Chinese Patent Office on Dec. 14, 2012 and entitled "METHOD AND APPARATUS FOR STORING DATA BASED ON KEY SEQUENCING", which is incorporated herein by reference in its entirety.

FIELD OF THE TECHNOLOGY

Implementation manners of the present invention relates to the field of information processing technologies, and in particular, to a data storage method and apparatus.

BACKGROUND OF THE DISCLOSURE

A key-value distributed storage system has the following advantages: a search speed is fast, a data storage amount is large, and high concurrency (for example, multiple concurrent search processes are supported) is supported, and so on. Therefore, the storage system is suitable for query performed by means of a primary key, but complex criteria query cannot be performed. If a real-time search engine is used to perform complex criteria retrieval and full text retrieval, a relational database having low concurrency, such as MySQL, may be replaced, so as to achieve objectives of high concurrency, high performance, and reducing the number of servers.

SUMMARY

Implementation manners of the present invention provide a data storage method, which can improve utilization of storage space.

The implementation manners of the present invention further provide a data storage apparatus, which can improve utilization of storage space.

Specific solutions of the implementation manners of the present invention are as follows:

A data storage method includes:
storing a fixed-length key and a value thereof into a first data block, the storing a fixed-length key including: uniformly storing a common prefix of each fixed-length key, and separately storing a remainder part of each fixed-length key after the common prefix is removed; and
storing a variable-length key and a value thereof into a second data block, the storing a variable-length key including: storing a variable-length key of a base-key type in a full storage manner, and performing prefix compression on a variable-length key of a prefix-compressed key type.

A data storage apparatus includes a fixed-length key storage unit and a variable-length key storage unit,
the fixed-length key storage unit being configured to store a fixed-length key and a value thereof into a first data block, the storing a fixed-length key including: uniformly storing a common prefix of each fixed-length key, and separately storing a remainder part of each fixed-length key after the common prefix is removed; and
the variable-length key storage unit being configured to store a variable-length key and a value thereof into a second data block, the storing a variable-length key including: storing a variable-length key of a base-key type in a full storage manner, and performing prefix compression on a variable-length key of a prefix-compressed key type.

As can be seen from the foregoing technical solutions, a prefix compression manner is used in a variable-length key data block, which can effectively reduce storage space of data, and improve disk utilization of a machine.

BRIEF DESCRIPTION OF THE DRAWINGS

The following accompanying drawings are some examples of the technical solutions of the present disclosure, and the present disclosure is not limited to features shown in the figures. In the following accompanying drawings, similar reference signs represent similar elements.

FIG. 2 is a schematic diagram of a file format according to an implementation manner of the present invention;

FIG. 3 is a flowchart of a data storage method according to an implementation manner of the present invention;

FIG. 10 is a schematic diagram of a storage structure of a file header according to an embodiment of the present invention;

DESCRIPTION OF EMBODIMENTS

For brief and intuitive description, the following describes the solutions of the present disclosure by describing several typical embodiments. A large amount of details in the embodiments are merely used to help understand the solutions of the present disclosure. However, obviously, the implementation of the technical solutions of the present disclosure is not limited to these details. To avoid making the solutions of the present disclosure obscure, some implementation manners are not described in detail, but only a framework is given. In the following description, "including" means "including, but not limited to,", and "according to . . . " means "at least according to . . . , but the basis is not limited to . . . ". Due to the language convention of Chinese, when the number of elements is not specified in the following description, it means that there may be one or more elements, or it may be understood that there is at least one element.

Figure 1:
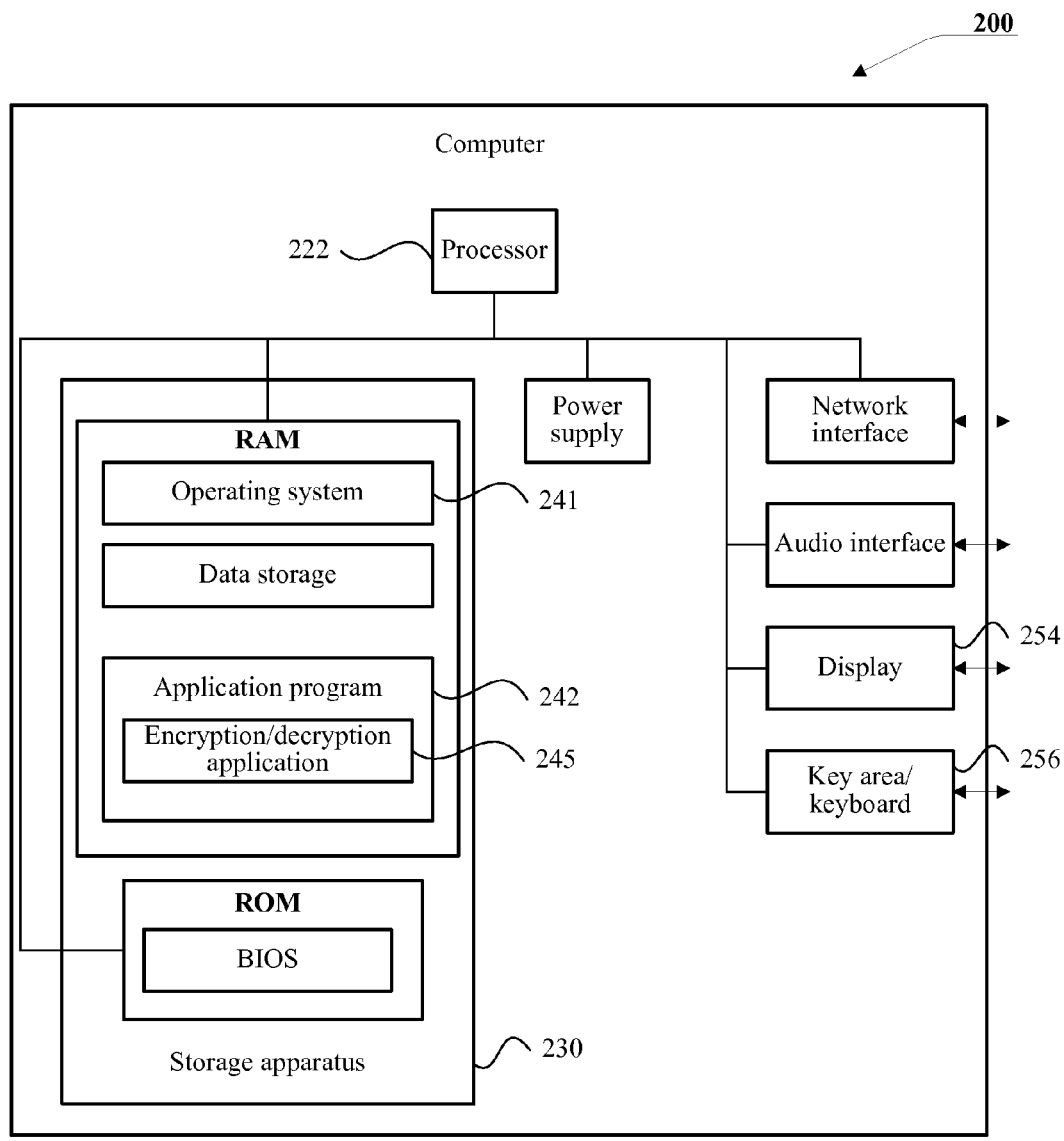
FIG. 1 is a schematic structural diagram of a computing device according to an embodiment.

FIG. 1 is a schematic structural diagram of a computing device according to an embodiment. As shown in FIG. 1, the computing device 100 may be a computing device that can implement a method and a software system that are provided in examples of the present disclosure. For example, a computer 100 may be a personal computer or a portable device, such as a notebook computer, a tablet, a mobile phone, or a smart phone. The computer 100 may also be a server connected to the foregoing device through a network.

The computer 100 may have different performance and features. Various possible implementation manners fall within the protection scope of this specification. For example, the computing device 100 may include a key area/keyboard 156, and may further include a display 154, for example, a liquid crystal display (LCD), or a display having an advanced function, such as a touch-sensitive 2D or 3D display. In an example, a computer 100 having a web function may include one or more physical keyboards or virtual keyboards, and a bulk storage apparatus 130.

The computer 100 may further include or allow various operating systems 141, for example, the Windows™ or Linux™ operating system, or a mobile operating system, such as iOS™, Android™, or Windows Mobile™. The computer 100 may include or run various application programs 142, such as a data storage application 145. The data storage application 145 can store sequenced records into a non-volatile storage apparatus 130 in a file format of this embodiment of the present invention.

In addition, the computer 100 may include a non-volatile storage medium 130 readable by one or more processors, and one or more processors 122 communicating with the storage medium 130. For example, the non-volatile storage medium 130 readable by the processor may be a RAM, a flash memory, a ROM, an EPROM, an EEPROM, a register, a hard disk, a removable hard disk, a CD-ROM, or another non-volatile storage medium in another form. The storage medium 130 may store a series of instructions or a unit and/or module including an instruction, configured to implement operations of embodiments of the present invention. The processor may execute the foregoing instructions, to implement operations in the embodiments.

An implementation manner of the present invention provides a file format enabling data persistency, which may be based on key sequencing, and support a fixed-length key, a variable-length key, and values thereof, where the key may have a compressed prefix. In addition, in this implementation manner of the present invention, a data block (block) is used as a unit for storage, which facilitates IO and parsing.

Preferably, in this implementation manner of the present invention, a prefix compression manner is used in a data block to compress each data block, thereby effectively reducing storage space of data, and improving disk utilization of a machine. During data reading, to-be-searched data can be quickly positioned according to an index block and a sequence in the data block.

A method for storing data based on key sequencing in this implementation manner of the present invention may include the following steps:

storing a fixed-length key and a value thereof into a first data block, where the storing a fixed-length key includes: uniformly storing a common prefix of each fixed-length key, and separately storing a remainder part of each fixed-length key after the common prefix is removed; and storing a variable-length key and a value thereof into a second data block, where the storing a variable-length key includes: storing a variable-length key of a base-key type in a full storage manner, and performing prefix compression on a variable-length key of a prefix-compressed key type.

In this implementation manner of the present invention, an execution sequence of the foregoing steps is not limited.

The first data block is dedicatedly used for storing the fixed-length key and the value thereof, and the second data block is dedicatedly used for storing the variable-length key and the value thereof.

In an example, the variable-length key may be grouped into a base-key type or a prefix-compressed key type according to a preset threshold length and a threshold difference, where a prefix of a current variable-length key is compared with a prefix of a previous base key, and if a length of a same prefix string is less than the threshold length, it is determined that the current variable-length key is the base-key type;

the prefix of the current variable-length key is compared with the prefix of the previous base key, and if the length of the same prefix string is greater than a sum of the threshold length and a threshold difference, it is determined that the current variable-length key is the base-key type; and the prefix of the current variable-length key is compared with the prefix of the previous base key, and if the length of the same prefix string is greater than the threshold length and is less than the sum of the threshold length and the threshold difference, it is determined that the current variable-length key is the prefix-compressed key type.

In an example, the performing prefix compression on a variable-length key of a prefix-compressed key type includes:

for the variable-length key of the prefix-compressed key type, storing a length of a common prefix of the variable-length key of the prefix-compressed key type and a previous base key, and storing a remainder part of the variable-length key of the prefix-compressed key type after the common prefix is removed.

In an implementation manner, when it is determined that the fixed-length key and the value thereof fail to be stored into the first data block, the first data block is compressed, and a storage buffer area is allocated; when a size of the compressed first data block is less than that of the storage buffer area, the compressed first data block is written into the storage buffer area; and when it is determined that the variable-length key and the value thereof fail to be stored into the second data block, the second data block is compressed, and a storage buffer area is allocated; when a size of the compressed second data block is less than that of the storage buffer area, the compressed second data block is written into the storage buffer area.

In an example, the method may further include:

when it is determined that the fixed-length key and the value thereof are successfully stored into the first data block, writing bloom filter information of the fixed-length key and the value thereof into a bloom filter;

when it is determined that the variable-length key and the value thereof are successfully stored into the second data block, writing bloom filter information of the fixed-length key and the value thereof into the bloom filter.

In an implementation manner, a read buffer area may be set; and when it is determined that a read length of a read operation is less than that of the buffer area and a current data block is not the last data block, a start address of a next data block is taken out, a length of the next data block is recorded, and reading is continued until the read length is greater than the length of the buffer area.

In this implementation manner of the present invention, a file format is formed by data blocks (including a data block 1, a data block 2, ..., a data block n), a bloom filter, an index block, and a file header part (including a file header and a file header length).

The data block stores sequenced records, where the record includes a Key and a value. The Key may be grouped into a fixed-length key and a variable-length Key.

A key of a same type and a value thereof may be stored in a same data block, for example, the data block 1 is dedicatedly used for storing a fixed-length Key and a value thereof, and the data block 2 is dedicatedly used for storing a variable-length Key and a Value thereof. In addition, there may be multiple data blocks that are dedicatedly used for storing a Key of a same type and a Value thereof.

In a data block used for storing a fixed-length Key and a Value thereof, only one copy of a common prefix of each fixed-length key is stored preferably, and for each key, only a remainder part of the key (that is, a different part: a remainder) after the common prefix is removed is stored.

In a data block used for storing a variable-length Key and a Value thereof, a base key and a prefix-compressed key may be distinguished according to a preset threshold length and a threshold difference. For the base key, full storage is performed; and for the prefix-compressed key, a prefix length (variable-length integer compression) of a current prefix-compressed key and a prefix length of a previous base key are stored, and then a remainder part of the prefix-compressed key is stored.

In the data block used for storing a fixed-length key and a Value thereof and the data block used for storing a variable-length Key and a Value thereof, for the value part (variable-length), a compression result of all cells belonging to a same key may be stored.

Based on the foregoing file structure, when all blocks are full of records, the blocks are written into a file in sequence. If the block resides in a memory (the block residing in the memory needs to be managed by a file writer (such as an SSTable writer), if the SSTable writer disappears, the block residing in the memory also disappears, and a user needs to construct an SSTable reader, to invoke an assignment method of the SSTable writer to swap out a dumped block), the block is allocated, and the block is held in the SSTable writer; and if the block does not reside in the memory, the block is directly dumped to the SSTable.

When write of all blocks is completed, the blocks may be written into meta data (that is, information about a bloom filter, a block index, a header, and a header length) of a file, and in this case, write of a file writer is completed.

For the variable-length key, when a record is written into a block that is based on the file format in this implementation manner of the present invention, temporary space needs to be allocated to store a key offset, a base offset, a key, a data offset, and data.

(1). When the first record is written, offsets of the current key and data in temporarily-allocated areas of the key offset and data offset (when the first record is written, the offset is 0) is set, and whether the current key can be a base key is calculated; if the current key can be the base key, a base offset is recorded (compression is performed by using the current key as a base, and the key is not compressed), and the key and data are stored into the temporarily-allocated areas.

(2). Each time one record is written, a prefix of a current key is compared with a prefix of a base key of a previous record (a base offset of a previous record is acquired, when a length of a common prefix string is greater than a threshold (threshold_len, which can be set)), prefix compression is performed, where a base offset corresponding to the key stores an offset of the base key of the previous record, a length (represented by var int) of the compressed same prefix is obtained; then, in the temporarily-allocated area of the key, the length (represented by var int) of the same prefix and a different part of the key are written into a location starting from an end location of the previous write; and the offset of the data and the data are written into temporarily-allocated areas of the data offset and data.

(3). Each time one record is written, a prefix of a current key is compared with a prefix of a base key of a previous record; when a length of a same prefix string is less than a threshold, prefix compression is not performed, the key is used as the base key for storage, and the base offset is set to an offset of the current key (compression is performed by using the current key as a base, and the key is not compressed); then, in the temporarily-allocated area of the key, the key is written into a location starting from an end location of previous write; the data offset and the data are written into temporarily-allocated areas of the data offset and the data.

(4). Each time one record is written, a size of used space in a block storage area is calculated; if a sum of sizes of temporarily-allocated areas is greater than a block size, the block is full, and the current record is not written into the block. In this case, whether to write content of temporarily-allocated areas of the base offset, the key, the data offset, and the data into an unused area of the block is considered.

For the fixed-length key, each time one record is written, the longest common string of currently-written records is calculated; when the block is full, the length of the longest common string and the longest common string are already calculated, where a storage structure of a memory of the block is that: the longest common string is first stored; then, a remainder string of each key is stored; then, data is stored; and finally, a block header is stored.

A read operation of a data block that is based on the file format of this implementation manner of the present invention mainly includes: during read of a record, searching the block according to an index of the record; or, searching the block, according to the key, for an index corresponding to the record.

(1). An offset of the key, and the base offset are found according to a record index; it may be determined according to the base offset whether prefix compression has been performed on the key of the current record; if the prefix compression has not been performed, the key is directly read; if the prefix compression has been performed, the base key and a current location for storing the key are found according to the base offset, a length (var int) of the prefix string is acquired, and the key is recovered.

(2). The offset of the data is found according to the record index, and a data field of the current record is acquired.

(3). The record index is searched for according to the key, and rapid positioning is performed mainly according to a dichotomic method.

In this implementation manner of the present invention, a bloom filter is a special degraded hash table. It is degraded to such a degree that: collision is not processed, and a key value is not stored. In the bloom filter, the number of times of hash may be set, a location of a record in a bitmap is calculated according to the number of times of hash and a key of each record, and setting is performed.

During read of a record, first-layer filtering is performed according to the bloom filter; whether a location of the record in the bitmap is set to 1 is calculated according to the number of times of hash, and a key of each record; if the location is not 1, the current key does not exist in the file; if the location is 1, the current key may exist in the file, and the file is searched according to an end key of the block index in the file.

In this implementation manner of the present invention, a storage manner (a variable-length key, and a variable-length value) of an index block is similar to a storage manner of a block. The key field is a cell key, and a full key (a row key+cfid+column) of the last cell storing each data block; and a value field is an offset (offset length) of the data block in the file, and a length of the current row key.

In this implementation manner of the present invention, a file header stores file-related information and an offset and a length of each part, which helps rapidly position each part, and reduces wastes of system resources caused by the fact that traverse is performed from the start of the file.

The following may be set in the file header:

(1) a KV type of a record written into the file;
(2) a compression method of each block;
(3) for a fixed-length key, it is the length of the key; and for a variable-length key, it is 0;
(4) for fixed-length data, the value is the length of the data; and for variable-length data, it is 0;
(5) used for selecting a base key for a variable-length key; a threshold length of a common prefix string of the variable-length key and a previous base key;
(6) used for selecting a threshold of a base key for a variable-length key; representing a difference between a length of a common prefix string of the variable-length key and a previous key and a length of a common prefix string of the variable-length key and a current base key;
(7) file id number;
(8) whether the file resides in a memory;
(9) table number;
(10) LG id number;
(11) the number of records in the sstable;
(12) a length of the sstable before compression;
(13) a length of the sstable after compression;
(14) a size of the block;
(15) a length of an index block after compression;
(16) a length of an index block before compression;
(17) an offset of an index block;
(18) an offset of a bloom filter block;
(19) a length of a bloom filter block;
(20) the number of hashes of the bloom filter;
(21) a collision probability of the bloom filter;
(22) a creation timestamp of the sstable;
(23) the number of sstable rows; and
(24) the number of sstable cells.

Based on the foregoing detailed description, the present disclosure provides a method for writing record data.

In this implementation manner of the present invention, a record is first written into a block; if the write succeeds, bloom filter information of the current record is written into a bloom filter structure; if the write fails, it indicates that the current block is full of data, the current block is compressed, and an appropriate write buffer is allocated according to a size of unused space in the write buffer and a size of the block; if the current write buffer has enough space, the block is written into the write buffer; and if the write buffer has insufficient space, content of the existing write buffer is written into a disk. The write buffer is equivalent to a layer of cache, where several blocks written into the buffer are written into the disk at a time.

In each block write process, the last key of the block is written into a block index structure.

When write of all records is completed, the bloom filter and the block index are already generated, the records are written into the bloom filter and the block index in sequence, and location information of the bloom filter and the block index is recorded in an SSTable Header.

Then, the file header is written into a disk. Finally, a file header length is recorded in the disk.

This embodiment of the present invention provides a file format (in the following, this file format is referred to as an sstable format, and a file in this format is referred to as an sstable file). This file format may be used to persistently store data, and this is also referred to as data persistency. This file format may be used to store records having a fixed-length key, a variable-length key, and a value. One record includes a key and a value. In the following, a key and a value belong to a same record of the key are briefly referred to as a key and a value thereof, or a key and a corresponding value; or a key and a value of a current record are referred to as a current key and a current value. The key is a key word of the record, which may be input by a user, or may also be generated in another manner.

FIG. 2 is a schematic diagram of a file format according to an implementation manner of the present invention. As shown in FIG. 2, the file format is formed by data blocks (including a data block 1, a data block 2, . . . , and a data block n) and meta data. The meta data includes a bloom filter, an index block, and a file header part (including a file header and a file header length).

The data block (block) is used for storing records, where the records may be sequential or unsequential. In an example, the data block may store records that are already sequenced according to keys.

The bloom filter is a special degraded hash table. It is degraded to such a degree that: collision is not processed, and a key value is not stored. The bloom filter stores information (also referred to bloom filter information) about whether each record is in a file. When one record is written, a location of the record in a bitmap may be calculated according to the preset number of times of hash and a key of the record, and a value of the location is set to represent that the key exists in the file. For example, when a value of the location of the record in the bitmap is not 1, it represents that the record does not exist in the file; when the value of the location of the record in the bitmap is 1, it represents that the record may exist in the file. When a key is searched for, a location of the key in the bitmap may be calculated according to the preset number of times of hash and the key, and whether the key exists in the file is determined according to the location.

An index block part is used for storing location information of each data block and range information of a key stored in each data block. In an example, when the stored records are sequenced according to keys, for example, the records are sequenced according to ASCII codes of the keys, the last key stored in each data block may be recorded in the index block and is used as an block index key (end key); in this way, a data block storing the record may be determined according to the block index key in the index block, and the data block is read according to the location of the data block, so as to search for the record in the data block.

A file header part (including a header and a header length) is used for storing file-related information and an offset and a length of each part, which helps rapidly position each part, and reduces wastes of system resources caused by the fact that traverse is performed from the start of the file.

Based on the foregoing file format, in an example, a process for generating an sstable file includes: writing a record into a data block (also briefly referred to as a block); if the write succeeds, writing bloom filter information of the current record into a bloom filter structure; when one block is full, writing the block index information into an index block part;

and when write of all blocks is completed, writing the block into meta data of the file, where in this case, write of the file is completed.

In this implementation manner of the present invention, a data block (block) is used as a unit for storage, which can improve an IO throughput, improve the parsing efficiency, and increase a parsing speed.

In an example, when the record is written into an sstable file of a disk, a storage buffer area (write buffer) in the memory may be allocated first for the file; multiple temporary storage areas in the memory are allocated for one data block, and information about items of the record is written into the temporary storage areas, for example, a temporary storage area may be allocated to each part in a data block structure. If the write fails, it indicates that the current data block is full, and whether space of a storage buffer area is sufficient is determined according to a size of unused space in the storage buffer area (writer buffer) and a size of the current data block. If the current storage buffer area has sufficient space, the data block is written into the storage buffer area; and if the storage buffer has insufficient space, content in the existing storage buffer area is written into a disk, and a storage buffer area is re-allocated to store the current data block and a subsequent possible data block. The storage buffer area is equivalent to a layer of cache, and is used for buffering several written blocks, and the blocks are written into the disk at a time, so as to reduce interaction with the disk, and increase a write speed, thereby improving the disk write efficiency. In another example, another buffer mechanism may be used, for example, each time a block is full, the block is written into a disk, which is not limited in the present invention.

In an example, when a block is written into a file, the block may be compressed first, and then, the compressed block is written, which can save storage space.

The key in the record may be a fixed-length key or a variable-length key. A length of the fixed-length key is equal to a preset value, and a length of a variable-length key has no fixed value. In an example, a key of a same type and a value thereof may be stored in a same data block, for example, the data block 1 is dedicatedly used for storing a fixed-length Key and a value thereof, and the data block 2 is dedicatedly used for storing a variable-length Key and a value thereof. There may be multiple data blocks used for storing a key of a same type and a value thereof.

FIG. 3 is a flowchart of a data storage method according to an implementation manner of the present invention. As shown in FIG. 3, the method may include the following steps:

Step S11: Store a fixed-length key and a value thereof into a first data block, where the storing a fixed-length key includes: uniformly storing a common prefix of each fixed-length key, and separately storing a remainder part of each fixed-length key after the common prefix is removed.

Step S12: Store a variable-length key and a value thereof into a second data block, where the storing a variable-length key includes: storing a variable-length key of a base-key type in a full storage manner, and performing prefix compression on a variable-length key of a prefix-compressed key type.

In this implementation manner of the present invention, an execution sequence of step S11 and step S12 is not limited.

In the following, a data block that is dedicatedly used for storing a fixed-length key and a value thereof is referred to as a first data block, and a data block that is dedicatedly used for storing a variable-length key and a value thereof is referred to as a second data block. A size of each data block may be preset, where the preset size may be determined by means of user setting or in another manner. A same size may be set for all data blocks, or sizes may be set separately for the first data block and the second data block.

In an example, during storage of a fixed-length key, the first data block may store only one copy of a common prefix of the fixed-length key, and store a remainder part (that is, a different part: remainder) of the key after the common prefix is removed.

Figure 4:
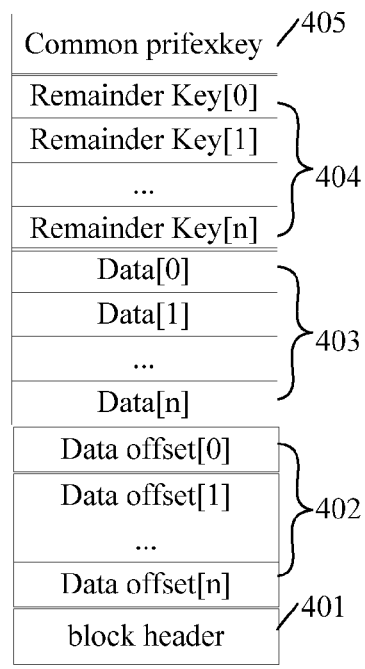
FIG. 4 is a schematic diagram of a storage structure of a data block used for storing a record having a fixed-length key according to an embodiment of the present invention.

FIG. 4 is a schematic diagram of a storage structure of a data block used for storing a record having a fixed-length key according to an embodiment of the present invention. As shown in FIG. 4, the data block is formed by the following parts (which is also referred to as a field): a block header 401, a data offset 402, data 403, a remainder key 404, a common prefix key 405.

The block header 401 stores information of the data block, which may be defined according to needs, for example, the information may include a length of a common prefix stored in the common prefix key 405.

The common prefix key 405 refers to a common prefix part of all keys stored in the data block.

The data offset 402, the data 403, and the remainder key 404 each includes multiple storage cells, and each storage cell of each part corresponds to one record. Each record in the data block corresponds to one storage cell of the remainder key 404, one storage cell of the data offset 402, and one storage cell of the data 404, that is, information of three storage cells corresponding to one record is obtained in the data block, and the record (key+value) can be recovered by using the information and the common prefix key 405.

The remainder key 404 stores a remainder part of each key after the common prefix is removed.

The data offset 402 stores an offset, relative to a start location, of a storage location of each piece of data (that is, a value in each record) in the block, and is used for positioning each value in the block.

The data 403 stores values in the records.

Figure 5:
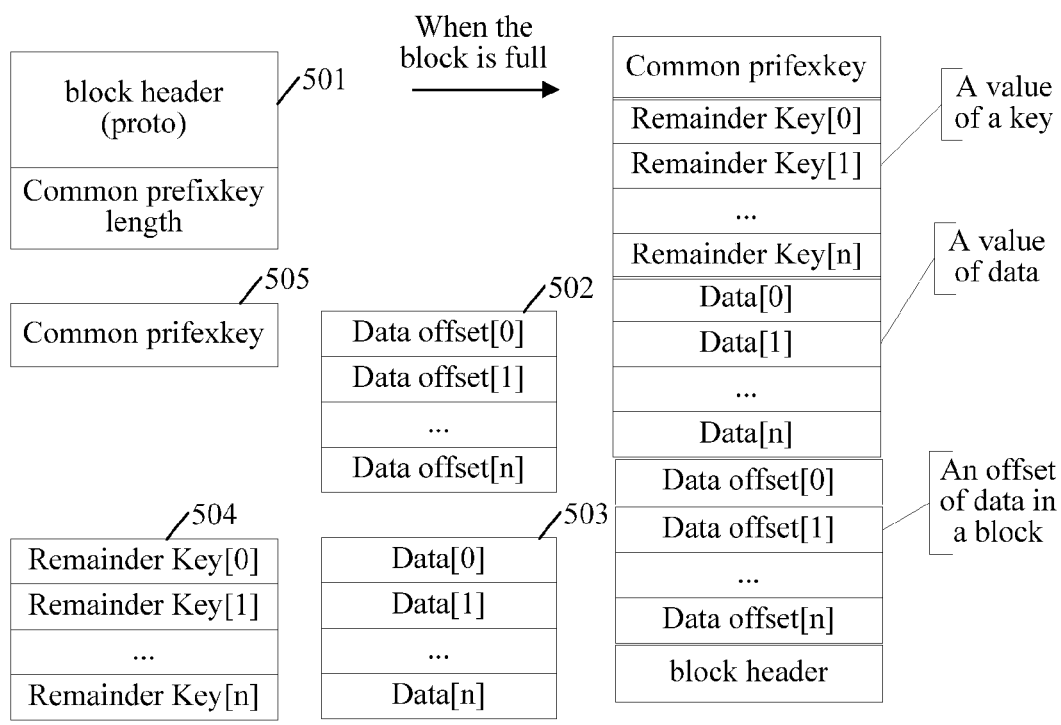
FIG. 5 is a schematic diagram of a process of writing a fixed-length key into a data block according to an implementation manner of the present invention.

FIG. 5 is a schematic diagram of a process of writing a fixed-length key into a data block according to an embodiment of the present invention. As shown in FIG. 5, temporary storage space 501, 502, 503, 504, and 505 may be allocated in the memory for the block header 401, the data offset 402, the data 403, the remainder key 404, and the common prefix key 405 of the first data block described in FIG. 4. The common prefix is written into the temporary storage space 505, and a length of the common prefix is written into the temporary storage space 501.

When one record is written, a part the same as the common prefix is removed from a key prefix in the record, and a remainder key is written into a storage cell of the temporary storage space 504 corresponding to the record. The value of the record is written into a storage cell in the temporary storage space 503 corresponding to the record, and an offset of the storage cell in the temporary storage space 503 is written into a storage cell, corresponding to the record, in the temporary storage space 502.

Each time one record is written, a sum of sizes of the foregoing storage space 501, 502, 503, 504, and 505 may be calculated. If the sum is greater than a preset size of a data block, the data block is full, and the current record is not written into the data block, that is, storage of the current record fails. Content of the temporary storage space 502, 503, 504, and 505 are separately written into a storage buffer area (write buffer) according to a storage structure (for example, according to the storage structure shown in FIG. 4) of the data block, and information, for example, locations (for example, offsets) of the data offset 402, the data 403, the remainder key 404, and the common prefix key 405 in the data block, of written parts is separately recorded in the temporary storage space 501 of the block header. Finally, content of the temporary storage space 501 is written into a storage buffer area. Till now, a write process of the first data block is completed. If there still is a record that is not written and has a fixed-length key, temporary storage space may be re-allocated, and the foregoing write process of the data block is repeated, to generate a new data block.

A common prefix of the fixed-length key may be determined according to actual needs. For example, the number of records that can be stored in the data block may be predicted according to a size of temporary storage space allocated to store the remainder key 404, and then keys of a corresponding number of records are read, to obtain a common prefix of the keys.

In an example, when it is determined that the fixed-length key and the value thereof fail to be stored into the first data block, it is determined that the first data block is full. The first data block may be compressed to reduce storage space of data. When a size of the compressed first data block is less than a size of available space of a storage buffer area, the compressed first data block is written into the storage buffer area.

In an example, during storage of a variable-length key, the variable-length key may be grouped into a base key and a prefix-compressed key. For the base key, full storage is performed, that is, an entire key is stored. For the prefix-compressed key, a length of a common prefix (which is briefly referred to as a same prefix or a same prefix string) of a current prefix-compressed key and a base key thereof is stored, and then a remainder part after the same prefix of the prefix-compressed key is removed is stored (in the following description, this step is briefly referred to as prefix compression, or variable-length integer compression).

Figure 6:
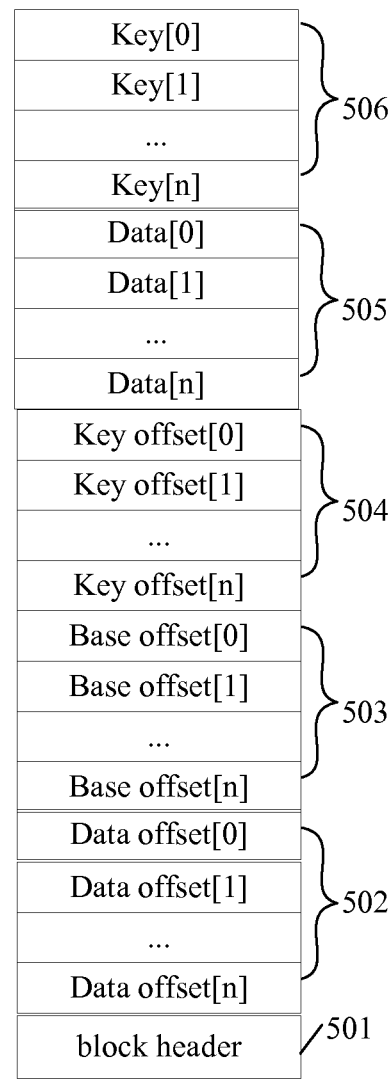
FIG. 6 is a schematic diagram of a storage structure of a data block used for storing a record having a variable-length key according to an embodiment of the present invention.

FIG. 6 is a schematic diagram of a storage structure of a data block used for storing a variable-length key according to an embodiment of the present invention. As shown in FIG. 6, the data block is formed by a block header 601, a data offset 602, a base offset 603, a key offset 604, data 605, and a key 606.

The block header 601 stores information of the data block, where the information may be defined according to needs.

The data offset 602, the base offset 603, the key offset 604, the data 605, and the key 606 each includes multiple storage cells, and each storage cell of each part corresponds to one record. Each record in the data block has a corresponding storage cell respectively in the data offset 602, the base offset 603, the key offset 604, the data 605, and the key 606, that is, as long as information about five storage cells corresponding to one record is found in the data block part, the record (key+value) can be recovered.

The data offset 602 stores an offset, relative to a start location, of a storage location of each piece of data (that is, a value in each record) in the block, and is used for positioning the data in the block.

The data 605 stores values in the records.

The base offset 603 stores an offset (that is, a key offset of a base key), relative to a start location, of a storage location of a base key of each key in the data block, and is used for positioning a base key of each key in the block. The base offset of the base key is set to 0.

The key offset 604 stores an offset, relative to a start location, of a storage location of each key in the data block, and is used for positioning each key in the block.

The key 606 stores a length of a same prefix of each key and a base key thereof, and a remainder part after the common prefix is removed.

In an example, a key of the first record written into the current data block may be used as the base key, and prefix compression is performed on a key of a subsequent record according to the base key.

In an example, the performing prefix compression on a variable-length key of a prefix-compressed key type includes: storing a length of a same prefix of the variable-length key of the prefix-compressed key type and a base key thereof, and storing a remainder part of the variable-length key of the prefix-compressed key type after the common prefix is removed.

A prefix compression manner is used in the data block, which can reduce data storage space and improve disk utilization of a machine.

One data block may have one or more base keys, and the variable-length key may be grouped into a base-key type and a prefix-compressed key type according to a preset method, that is, whether a variable-length key is a base key or a prefix-compressed key is determined.

In an example, the variable-length key may be grouped into a base-key type or a prefix-compressed key type according to a preset threshold length (threshold_len) difference. For example, a prefix of a current variable-length key is compared with a length of a current base key (that is, a base key of a previous key; when the current key is determined as the base key, to distinguish between the current key and a base key of a previous key, the base key of the previous key is also referred to as a previous base key); if a length of a same prefix string is less than the threshold length, it is determined that the current variable-length key is the base-key type; the prefix of the current variable-length key is compared with the prefix of the current base key; and if the length of the common prefix string is greater than the threshold length, it is determined that the current variable-length key is the prefix-compressed key type. The threshold length may be set according to needs.

In an example, the variable-length key may be grouped into a base-key type or a prefix-compressed key type according to a preset threshold difference. A length of a same prefix string of a current key and a previous key is calculated, and is marked as a first length. A length of a common prefix string of the current key and a current base key is calculated, and is marked as a second length. If the first length is less than a sum of the second length and the threshold difference, it is determined that the current base key is the base key of the current key, and a key offset of the current base key is used as a base offset of the current key; if the first length is greater than or equal to the sum of the second length and the threshold difference, it is determined that the current key is the base key, the current key is not compressed, and a base offset of the current key is set to 0. In an example, whether the length of the same prefix string of the current key and the previous key is less than a sum of a threshold length and the threshold difference may be determined directly; if the length is less than the sum, the variable-length key is used as the prefix-compressed key, and the current base key is a base key of the variable-length key; if the length is greater than or equal to the sum, the variable-length key is used as the base key.

Figure 7:
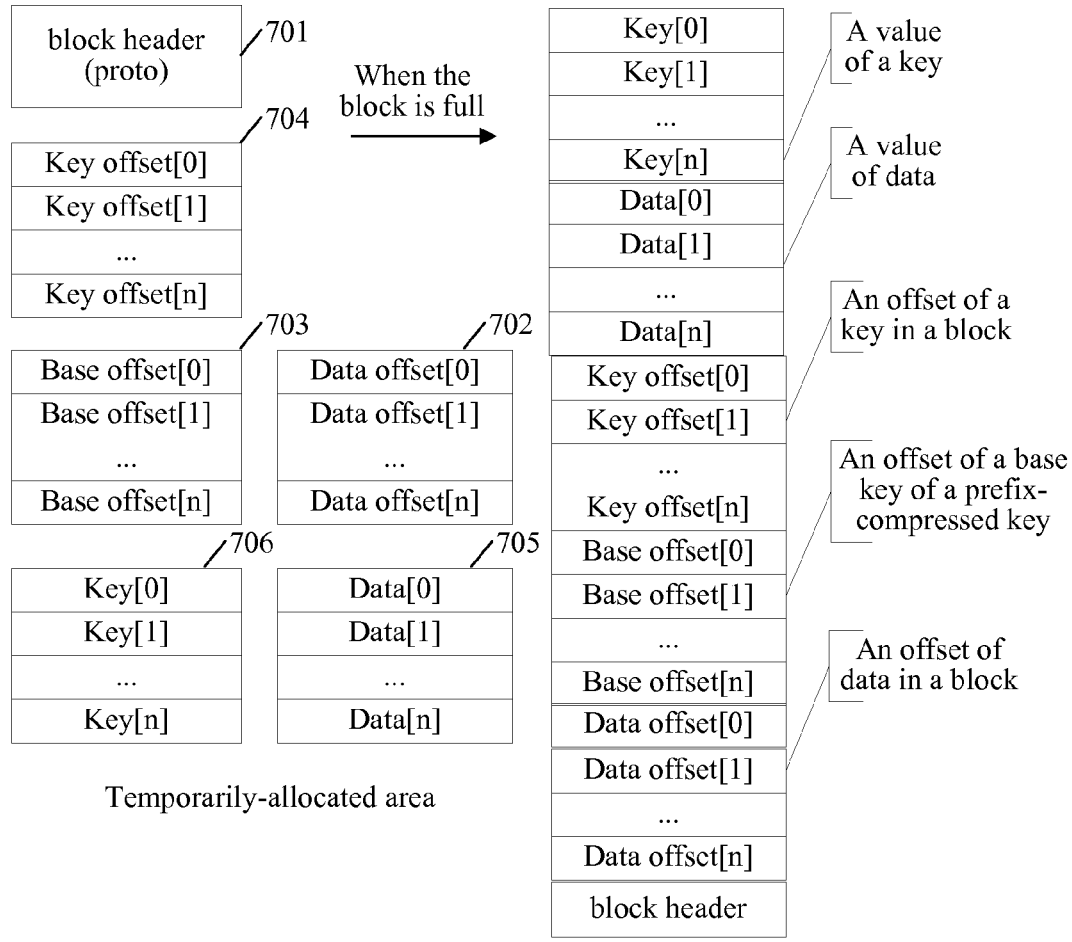
FIG. 7 is a schematic diagram of a process of writing a variable-length key into a data block according to an embodiment of the present invention.

FIG. 7 is a schematic diagram of a process of writing a variable-length key into a data block according to an embodiment of the present invention. In an example shown in FIG. 7, when the record is written into a data block in a format shown in FIG. 6, temporary storage space 701, 702, 703, 704, 705, and 706 in a memory may be allocated to the block header 601, the data offset 602, the base offset 603, the key offset 604, the data 605, and the key 606.

When the first record is written into the data block, a key of the first record is used as a base key. Because the base key is not compressed, an entire key is stored in a storage cell, corresponding to the record, in the temporary storage space 706 used for storing the key (for example, the first record may correspond to the first storage cell in each piece of the temporary storage space). The base offset of the key is stored into a storage cell, corresponding to the record, in the temporary storage space 703 used for storing a base offset. The base offset of the base key may be set to 0. Data (that is, the value) of the record is stored into a storage cell, corresponding to the record, in the temporary storage space 705 used for storing data. An offset (a location relative to a start location of the area) of the current key in the temporary storage space 706 is written into a storage cell, corresponding to the record, in the temporary storage space 704 used for storing a key offset. An offset (a location relative to a start location of the area) of the data of the current record in the temporary storage space 705 is written into a storage cell, corresponding to the record, in the temporary storage space 702 used for storing a data offset. A key offset of the first record and a corresponding data offset may both be set to 0.

Each time one subsequent record is written into the data block, whether a key of the current record can be a base key is calculated. If it is determined that the current key is a base key, it is determined that a base offset of the current key is 0, and an entire key (because the base key is not compressed) and a base offset are stored into storage cells, corresponding to the base offset, in the temporary storage space 706 and 703. If it is determined that the current key is a prefix-compressed key, a key offset of the current base key is written into a storage cell, corresponding to the current record, in the temporary storage space 703, prefix compression is performed on the key, that is, a length (represented by var int) of a same prefix of the current key and the base key and a different part (that is, a remainder part of the current key after the same prefix is removed) are stored into a storage cell, corresponding to the current record, in the temporary storage space 706. The key offset, the data offset, and the data of the current record are separately stored into storage cells, corresponding to the current record, in the temporary storage space 704, 702, and 705. In this way, write of a variable-length key is completed.

In an example, a method for determining a current base key may include: acquiring a base offset of a previous record, to determine a current base key. In an example, a method for determining a current base key may include: in a record write process, storing information of a current base key, for example, a key offset of the current base key. For example, one temporary storage space may be allocated to temporarily store information of the current base key. In this way, the current base key can be obtained according to the stored information of the current base key. When the current key is determined as the base key, the stored information of the current base key may be updated as the information of the current key, such as a key offset of the current key. In another example, another method may be used to determine a current base key.

In an example, each time one record is written, a sum of sizes of the foregoing temporary storage space 701, 702, 703, 704, 705, and 706 may be calculated. If the sum is greater than a preset size of a data block, the data block is full, and the current record is not written into the data block, that is, storage of the current record fails. Content of the temporary storage space 702, 703, 704, 705, and 706 are separately written into a storage buffer area (write buffer) according to a storage structure (for example, the storage structure shown in FIG. 6) of the data block, and information of written parts is separately recorded in the temporary storage space 701, for example, locations (for example, offsets) of the data offset 602, the base offset 603, the key offset 604, the data 605, and the key 606 in the data block. Finally, content of the temporary storage space 701 is written into a storage buffer area. Till now, a write process of the second data block is completed. If there still is a record that is not written and has a variable-length key, temporary storage space may be re-allocated, and the foregoing write process of the data block is repeated, to generate a new second data block.

In an example, each time one record is written or a data block is full, a sum of a size of used space in a block storage area (that is, the foregoing storage buffer area) and a size of each piece of temporarily-allocated space may be calculated; if the sum is greater than or equal to a size of the storage buffer area, the block storage area is full, and the current record or data block is not written, that is, the current record or data block fails to be stored; if the sum is less than the size of the storage buffer area, temporary storage space storing the base offset, the key, the data offset, and the data of the current record is written into unused area of the foregoing storage buffer area.

In an example, when it is determined that the variable-length key and the value thereof fail to be stored into the second data block, the second data block may be compressed. When a size of the compressed second data block is less than a size of available space of a storage buffer area, the compressed second data block is written into the storage buffer area. Each block is compressed, which can effectively reduce storage space of data.

In an example, when the data block stores a variable-length value (that is, a length of the value is not fixed), compression results of all storage cells corresponding to a same key may be stored, that is, a compressed value is stored, which can reduce storage space of data.

In an example, based on the file structure shown in FIG. 2, when all blocks (for example, all blocks in one storage buffer area, or all blocks in multiple storage buffer areas) are full of records, all blocks may be written into a file in an sstable format in sequence. For example, when the records are sequenced according to keys, the blocks may be written into the sstable file in sequence according to a sequence of the stored keys. If a data block resides in a memory, the data block is stored (hold) in a file writer (writer); if the data block does not reside in the memory, the data block is directly written into the sstable file. The data block residing in the memory needs to be managed by the file writer, and a user needs to construct a file reader (reader, such as an sstable reader) to read the data block. During read, a method (such as an Assign method, which may be implemented by using a function) of the file reader is invoked to swap out a data block that is written into the file. The file writer and the file reader provide interfaces for the user, so as to manage a block residing in the memory.

When write of all blocks is completed, the blocks are written into meta data of the file, and in this case, write of the file is completed. The meta data of the file includes information about a bloom filter, a block index, a file header, and a file header length.

Figure 8:
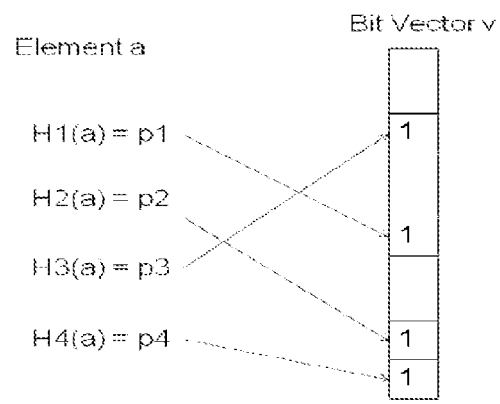
FIG. 8 is a schematic diagram of a storage structure of a bloom filter according to an embodiment of the present invention.

FIG. 8 is a schematic diagram of a storage structure of a bloom filter according to an embodiment of the present invention. In an example shown in FIG. 8, the bloom filter is a one-dimensional array or vector, for example, may be represented as {v1, v2, . . . , vn}. Each element corresponds to information about a key of one record stored in the file.

In an example, when it is determined that a fixed-length key and a value thereof are successfully stored into a first data block, bloom filter information of the fixed-length key and the value thereof are written into the bloom filter; and when it is determined that a variable-length key and a value thereof are successfully stored into a second data block, bloom filter information of the fixed-length key and the value thereof are written into the bloom filter.

Bloom filter information of the key may be obtained according to a preset calculation method, for example, the number of times of hash calculation on the key may be preset. The bloom filter information represents a location of the key in the bloom filter, where a value of the location represents whether the key exists in the file. In an example, when bloom filter information of a key is 1, it represents that the key may exist in the file; when bloom filter information of a key is not 1 (for example, is 0 or null), it represents that the key does not exist in the file. During search of a key, the bloom filter information of the key may be obtained according to a preset calculation method, a value of a location indicated by the bloom filter information is acquired from the bloom filter and then whether the key may exist in the file may be determined according to the obtained value.

After write of all records is completed, write of the bloom filter is completed. After all data blocks are written into a file, the bloom filter is written into the file. In an example, one piece of temporary storage space in the memory may be allocated to temporarily store the bloom filter; after storage of all records is completed, the bloom filter in the temporary storage space is written into an sstable file in the disk.

Figure 9:
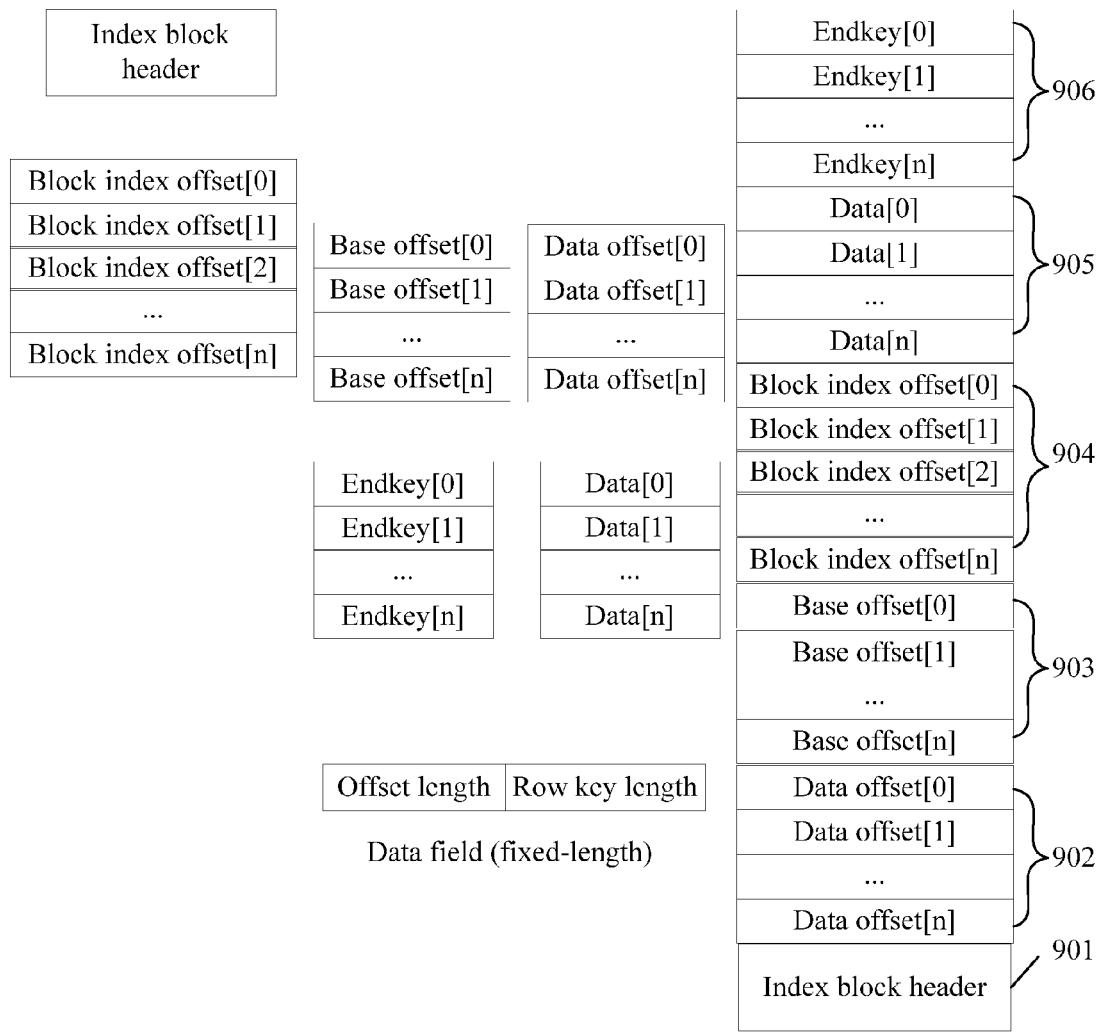
FIG. 9 is a schematic diagram of a process of writing block index information into an index block according to an embodiment of the present invention.

FIG. 9 is a schematic diagram of a process of writing block index information into an index block according to an embodiment of the present invention. As shown in FIG. 9, the index block includes an index block header 901, a data offset 902, a base offset 903, a block index offset 904, data 905, and a block index key 906.

The index block header 901 is configured to store information of the index block, including a start location and a length of each area in the index block.

The data offset 902, the data 905, the base offset 903, the block index offset 904, and the block index key 906, of each data block in the file, in the index block correspond to one storage cell respectively. A location of the data block in the file can be found according to information about items of one piece of data stored in the data offset 902, the data 905, the base offset 903, the block index offset 904, and the block index key 906.

A storage manner of an index block is similar to a storage manner of a data block (that is, the second data block) storing the variable-length key, where the storage manner may be that: a series of variable-length keys+values are stored, and each variable-length key+value corresponds to one data block.

Each key stored in the index block corresponds to a full key (end key), that is, an entire key, of the last storage cell (cell) of each data block, for example, the full key may include a row key+a column ID (cfid)+a column. For example, for the first data block storing the fixed-length key, the key is an entire form of the last key in the first data block, that is, a common prefix+a remainder key; for the second data block storing the variable-length key, the key is an entire form of the last key in the second data block, that is, when the last key is a base key, the key is the last key of the key 606; and when the last key is a prefix-compressed key, the key is a base key obtained according to a base offset of the last key, and an entire prefix-compressed key that is obtained after recovery according to the same prefix length the same as that of the base key and a different part that are stored in the key. In an example, the last successfully-written key may be recorded when the record is written into the data block; when the data block is full, the recorded last successfully-written key is written into the index block.

Each value stored in the index block corresponds to a location of each data block in the file, for example, an offset length and a current row key length. The location of the data block in the file may be written into the index block when the data block is written into the file.

Similar to the method for storing the second data block, in each part of one data block corresponding to the index block, the data offset 902 stores a storage location of a value (that is, a location of the data block in the file) of the data block in the index block; the data 905 stores a location (an offset) of a corresponding data block in the file; the block index offset 904 stores a storage location of the last key (end key) of a corresponding data block in the index block; the base offset 903 stores a storage location of the base key, of the end key (not a base key, of the end key, in the data block) of the data block, in the index block in the index block; and the block index key 906 stores a length of a common prefix length of the end key of the data block and the base key thereof in the index block and a remainder part of the end key after the common prefix is removed.

Each time write of a data block is completed, the key of the last record of the data block is written into the index block structure. Each time the data block is written into the file, information about the location of the data block in the file is written into the index block structure. A process of writing an end key and a value that correspond to each data block into an index block is similar to a process of writing a variable-length key and a corresponding value into a second data block, and no further details are provided herein again.

When write of all records is completed, write of an index block is completed. After the bloom filter is written into the file, the index block is written into the file. In an example, a temporary storage space in the memory may be allocated to temporarily store an index block; and after all data blocks and the bloom filter are written into a file in a disk, the index blocks in the temporary storage space are written into the file in the disk.

In an example, the file may be temporarily stored in the memory, and after each part of the file is written into the file in the memory, an entire file in the memory is swapped out to the disk. Therefore, the embodiments of the present invention may use different file generation manners, which are not limited in the present disclosure.

After write of all records is completed, each data block, a bloom filter, and an index block are written into the file in sequence, and information about locations of the bloom filter and the index block are recorded into a file header.

FIG. 10 is a schematic diagram of a storage structure of a file header according to an embodiment of the present invention. A file header stores file-related information and an offset and a length of each part, which helps rapidly position each part, and reduces wastes of system resources caused by the fact that traverse is performed from the start of the file. In an example, a file header structure may be shown in FIG. 10, and the following parts may be set for the file header.

(1) KV type, representing a KV type of a record written into a file; in an example, the KV type includes two key types (a variable-length key and a fixed-length key) and two value types (a variable-length value and a fixed-length value), and four cases are obtained through combination of the two key types and the two value types;

(2) a compression type, representing a compression method of each block;

(3) a length of a fixed-length key, where for a fixed-length key, the length is a length of the key, and for a variable-length key, the length is 0;

(4) a length of a fixed-length value, where for fixed-length data (that is, a value), the value is a length of the data, and for variable-length data, the value is 0;

(5) a threshold length, that is, a parameter used for determining whether the variable-length key is used as a base key, and a threshold representing a length of a common prefix string of the variable-length key and a current base key in the foregoing example;

(6) a threshold difference, that is, one of parameters used for determining whether the variable-length key is used as a base key in the foregoing example;

(7) file id number, representing an identifier of the file;

(8) In memory type, representing whether the file resides in a memory;

(9) Table No, used for invoking of an upper-layer application;

(10) Lg ID, used for invoking of an upper-layer application;

(11) the number of records, representing the number of records stored in an sstable file;

(12) a length before compression, representing a length of the sstable file before compression;

(13) a length after compression, representing a length of the sstable file after compression;

(14) a size of a data block, representing a size of each data block, that is, a parameter used for determining whether the data block is full, where the size may be set by a user;

(15) a length of an index block after compression;

(16) a length of an index block before compression;

(17) an offset of an index block;

(18) an offset of a bloom filter;

(19) a length of a bloom filter;

(20) the number of times of hash of the bloom filter, that is, one of parameters used for calculating bloom filter information of a key in the foregoing example;

(21) a collision probability of the bloom filter;

(22) a creation timestamp of sstable, representing a creation time of the sstable file;

(23) the number of rows, representing the number of rows in the sstable file; and

(24) the number of cells, representing the number of cells of the sstable file.

Finally, the file header and the file header length are written into the file. Till now, write of the file is completed.

A write process is that: multiple blocks are written at a time, thereby reducing interaction with a disk and increasing a write speed.

Figure 11:
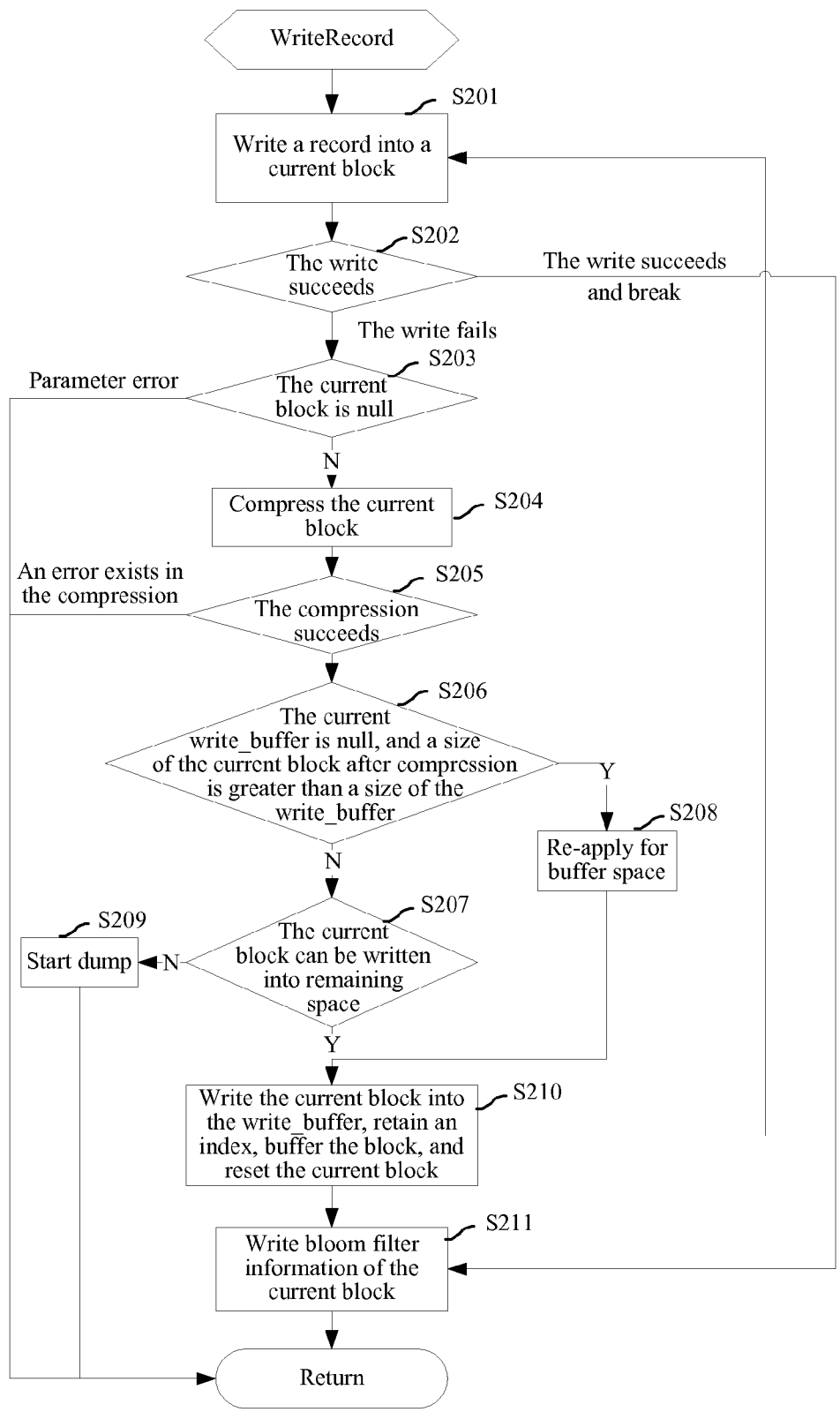
FIG. 11 is a schematic flowchart of writing a record into a file according to an embodiment of the present invention.

FIG. 11 is a schematic flowchart of writing a record into a file according to an embodiment of the present invention. As shown in a record data write process in FIG. 11, the method may include the following steps:

Step S201: Write a record into a current data block (also briefly referred to as a block), where, a record corresponding to a fixed-length key is written into a data block that is dedicatedly used for storing a fixed-length key and a value thereof, and a record corresponding to a variable-length key is written into a data block that is dedicatedly used for storing a variable-length key and a value thereof. The storing a fixed-length key includes: uniformly storing a common prefix of each fixed-length key, and separately storing a remainder part of each fixed-length key after the common prefix is removed; and the storing a variable-length key includes: storing a variable-length key of a base-key type in a full storage manner, and performing prefix compression on a variable-length key of a prefix-compressed key type.

Step S202: Determine whether a record in step S201 is written successfully; if yes, perform step S211 and subsequent steps; otherwise, perform step S203 and subsequent steps.

Step S203: Determine whether a current data block is null; if yes, return a parameter error and exit this process; if the current data block is not null, perform step S204 and subsequent steps.

Step S204: Compress the current data block.

Step S205: Determine whether the current data block is compressed successfully; if the current data block is compressed unsuccessfully, return that an error exists in the compression, and exit this process; if the current data block is compressed successfully, perform step S206 and subsequent processes.

Step S206: Determine whether a current buffer area (write_buffer) is null and whether a size of the current data block after compression is greater than a size of the buffer area; if yes, perform step S208 and subsequent steps; otherwise, perform step S207 and subsequent steps.

Step S207: Determine whether remaining space is enough for write of the current data block; if yes, perform step S210 and subsequent steps; otherwise, perform step S209 and subsequent steps.

Step S208: Re-apply for buffer space, and perform step S210 and subsequent steps.

Step S209: Start dump, and end this process.

Step S210: Write the current data block into the buffer area, retain an index, buffer a data block, and reset the current data block.

Step S211: Write bloom filter information of the current data block.

For a manner of reading a record that is stored based on a file format in the present disclosure, basic information, such as a header length, a file format header, a block index, and a bloom filter, is read in sequence.

In this embodiment of the present invention, the stored record may be sequenced in advance, for example, the records are sequenced according to ASCII codes of keys of the records. In this way, during data reading, to-be-searched data can be positioned rapidly according to the index block and a sequence of data in the data block.

The following describes a method for reading data from a file by using an example in which records that are sequenced in advance according to the keys are stored in the file.

In an example, for the record that are stored based on the file format described in FIG. 2, basic information, such as a file header length, a file format header, an index block, a bloom filter, may be read in sequence.

Figure 12:
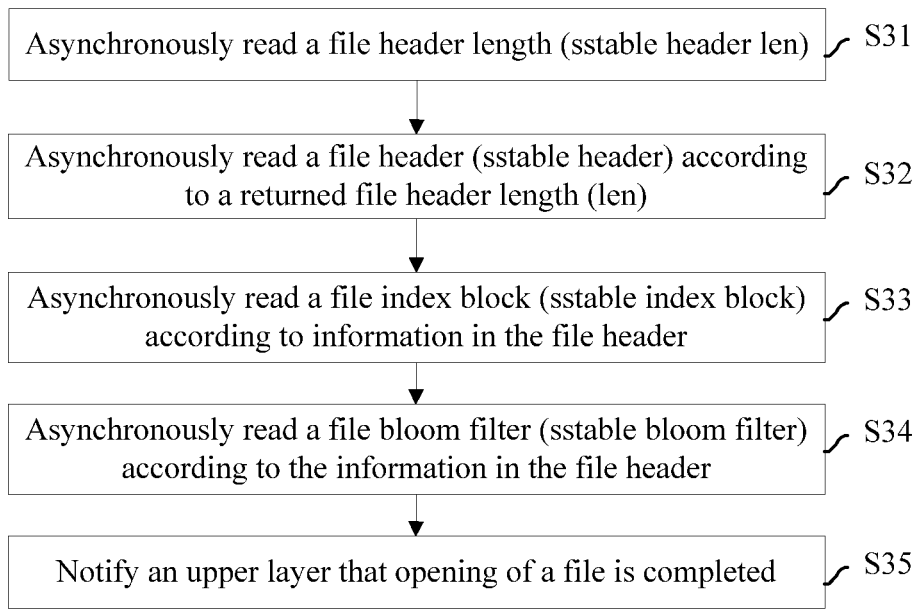
FIG. 12 is a schematic diagram of a file reading method according to an embodiment of the present invention.

FIG. 12 is a schematic diagram of a file reading method according to an embodiment of the present invention. As shown in FIG. 12, the method may include the following steps:

Step S31: Read a file header length field of a file, to acquire a length of the file header field.

Step S32: Read a file header field of a length of the file header.

Step S33: Read an index block field according to information in the file header field. For example, a start location of the index block in the file may be determined according to an offset of the index block in the file header, and then the index block is read starting from the start location according to a length of the index block after compression or a length of the index block before compression in the file header.

Step S34: Read a bloom filter field according to information in the file header field. For example, a start location of the bloom filter in the file may be determined according to an offset of the bloom filter in the file header, and then the bloom filter in the file is read starting from the start location according to a length of the bloom filter in the file header.

Step S35: Notify an upper layer that a process for opening an sstable file is completed.

After the opening of the file is completed, a record may be searched for according to the read content of the bloom filter and the index block.

In an example, search may be performed in the file for a record according to keys (for example, listening to a key that is input by a user and needs to be searched). Because a sequence of storing the records in the file is based on the key, a search process performed according to the key may be implemented by using a dichotomic method, thereby positioning the record.

In an example, during search of one key (which is called a target key in the following), a first-layer filter may be performed according to a bloom filter, that is, a location of the key in a bloom filter bitmap is calculated according to the number of times of hash in the file header, and then whether the key exists in the file is determined according to a value of the location in the bloom filter bitmap. For example, if the value is not 1, the key does not exist in the file; if the value is 1, the key may exist in the file, and then a record having the key is searched for in the file according to an end key used for storing each data block in the index block.

In an example, because the record is stored in each data block according to the sequence of the key, a data block that may store the target key is searched for in the index block by using a dichotomic method.

For example, a location and a length of a key offset area in the index block may be read from the index block header. A key offset (for example, a key offset at the center of the key offset area) at a selected location in the key offset area is acquired. A key corresponding to the key offset and a base offset of the key are acquired, so as to recover the key. As described above, the key stored in the index block is the last key of each data block, a value is a location of each data block in the file. The recovered key is compared with the target key; if they are equal, a data block corresponding to the key is directly read, and then the last key stored in the data block and a value corresponding to the key, which are the record to be found, are read. If the recovered key is not equal to the target key, whether the target key exists in a data block in which the recovered key is located or exists in a next data block of a data block in which the recovered key is located needs to be determined; if the target key does not exist in either of the two data blocks, the foregoing search process needs to be repeated, and a location range of a key offset to be searched is determined according to whether the recovered key is greater than the target key. For example, if keys are sequenced in an ascending order, if the recovered key is greater than the target key, a previous key of the recovered key is acquired, and whether the previous key is equal to the target key is determined; if the previous key is equal to the target key, a record in which the previous key is located is acquired, which is the record to be found; if the previous key is still greater than the target key, search of the target key is continued between a start location of the key offset area and a location in which the previous key is located; if the recovered key is less than the target key, a next key of the recovered key is acquired, and whether the next key is equal to the target key is determined; if the next key is equal to the target key, a record in which the next key is located is the record to be found; if the next key is still less than the target key, search of the target key is continued according to the foregoing method between a tail location of the key offset area and a location in which the next key is located. When it is determined that a size of the target key is between sizes of two adjacent keys in an index block, it is determined that the target key may be stored in a data block in which the latter key is located, the data block may be read, and the data block is searched for the target key.

In an example, when a data block in which the target key may be stored is determined, data may be acquired according to a data offset corresponding to the data block in the index block, that is, a location of the data block in the file. Then, the data block is read from a corresponding location of the file according to the location and a size of the data block in the file header.

Because information about items corresponding to a same data block is stored in an index block in a same sequence (or information about items corresponding to a same record is stored in the data block in a same storage sequence). Sequence numbers for storing the key offsets in the key offset area are sequence numbers for storing corresponding base offsets and data offsets in a base offset area and a data offset area. There are many methods for acquiring corresponding base offsets and data offsets according to the key offset.

For example, when the key offset, the base offset, and the data offset are fixed-length, a sequence number of the key offset in a key offset area may be calculated according to a location of the key offset in the key offset area, then, a base offset corresponding to the key may be obtained in the base offset area according to a length and the sequence number of the base offset, thereby obtaining the location of the key in the base key from the base offset. A method for acquiring a data offset corresponding to the key is the same as a method for acquiring data corresponding to the key.

For another example, a sequence number of each key offset, base offset, and data offset in a respective area may be stored in the key offset, base offset, and data offset; after a key offset of a key is acquired, a sequence number of information about items of the record in the data block (or information about items of the data block in the index block) can be obtained, and then a base offset corresponding to the sequence number is acquired in the base offset area. A method for acquiring a data offset corresponding to the key is the same as the foregoing.

A method for searching for a target key in a read data block is similar to a method for searching for a target key in an index block. When the records are stored according to a sequence of the keys, a dichotomic method may also be used, that is, a location (for example, a location at the center of the area) is selected from the key storage area, a key stored at the location is acquired and is compared with the target key, and then, a search range is further narrowed down. For example, when the records are stored in the data block in an ascending order of the keys, a start location and a length of the key offset area are read from the data block header. A location such as a middle location is selected from the key offset area, a key offset of the location is acquired, and the key is acquired according to the key offset. The recovered key is compared with the target key; if the recovered key is equal to the target key, a record corresponding to the key is the record to be found; if the recovered key is greater than the target key, a new location is selected from the start location of the key offset area and the foregoing selected location, and the foregoing search process is repeated; and if the recovered key is less than the target key, a new location is selected from a tail location of the key offset area and the foregoing selected location, and the foregoing search process is repeated.

A method for recovering a key from a storage location (a key offset) of the key in a data block is related to storage structures of the two types of data blocks described above.

For a fixed-length key (it may be determined according to a value of a KV type in a file header that the file stores the fixed-length key), a location and a length of a common prefix are read from the data block header, and the common prefix is read from the data block; a location of a remainder key is read from a header of the data block, and a storage location of the remainder key corresponding to the key is determined according to the key offset, so as to read the remainder key of the key; and then the key is recovered by adding the common prefix before the remainder key.

For a variable-length key (it may be determined according to a value of a KV type in a file header that the file stores a variable-length key), a location and a length of each area can be read from the header of the data block, a key and a base offset are read from the data block, and further the base key is read, and a same prefix length and a different part of the key are read; a string of the same prefix length is cut out from the base key prefix, and the key is recovered by adding the common prefix and the different part of the key. A method for acquiring a corresponding base offset, in the data block storing the variable-length key, according to a key offset of a key is the same as a method for acquiring a base offset corresponding to a key in the index block according to a key offset corresponding to the key (an end key of the data block), and no further details are provided herein again.

During recovery of the record by using a key offset, a data offset corresponding to the key may be acquired; then, a location of a data part is acquired from the header of the data block, a value corresponding to the key is read according to the data offset, that is, the record (key+value) can be recovered according to the key and the value. A method for acquiring a corresponding data offset according to a key offset is the same as a method for acquiring a data offset corresponding to a key from the index block according to a key offset of the key (an end key of the data block), and no further details are provided herein again.

In an example, during read of a record, a read buffer area may be set; and when it is determined that a read length of a read operation is less than that of the buffer area and a current data block is not the last data block, a start address of a next data block is taken out, a length of the next data block is recorded, and reading is continued until the read length is greater than the length of the buffer area. In another example, another buffering method may be used to read the file.

For reading of a block, after a location of a user key is sought according to a request of the user, the block in which the key is located is loaded to read information required by the user.

Reading of the data block is grouped into a pre-read and a delayed read. The pre-read refers to that multiple blocks are read at a time; the delayed read refers to that read is performed when multiple read requests are aggregated, that is, after multiple read requests are received, multiple blocks are read at a time.

Sizes of a read initial block and a read buffer are calculated according to information about the pre-read and the aggregated multiple times of read; the number of blocks needing to be read and a read length are calculated; and the start location and the length of the block are acquired from the block index.

A start address of a start block is first acquired; if a current block is the last block of an SSTable file, a length of the last block is directly acquired, is recorded, and then is returned; if the current block is not the last block of the SSTable file, a start address and a length of a next block are acquired.

If the pre-read manner is used, a read length is less than a length of the read buffer, and a current block is not the last block, a start address of a next block is acquired and a length of the next block is recorded, until the read length is greater than the length of the read buffer.

If the delayed read manner is used, information about a block that is read each time is aggregated, and then, a manner of acquiring and reading a start address of the start block is similar to the pre-read manner.

The pre-read and the delayed read essentially refer to that, multiple blocks are read at a time, which reduces seek and rotation during disk reading, and increases a disk read speed.

Figure 13:
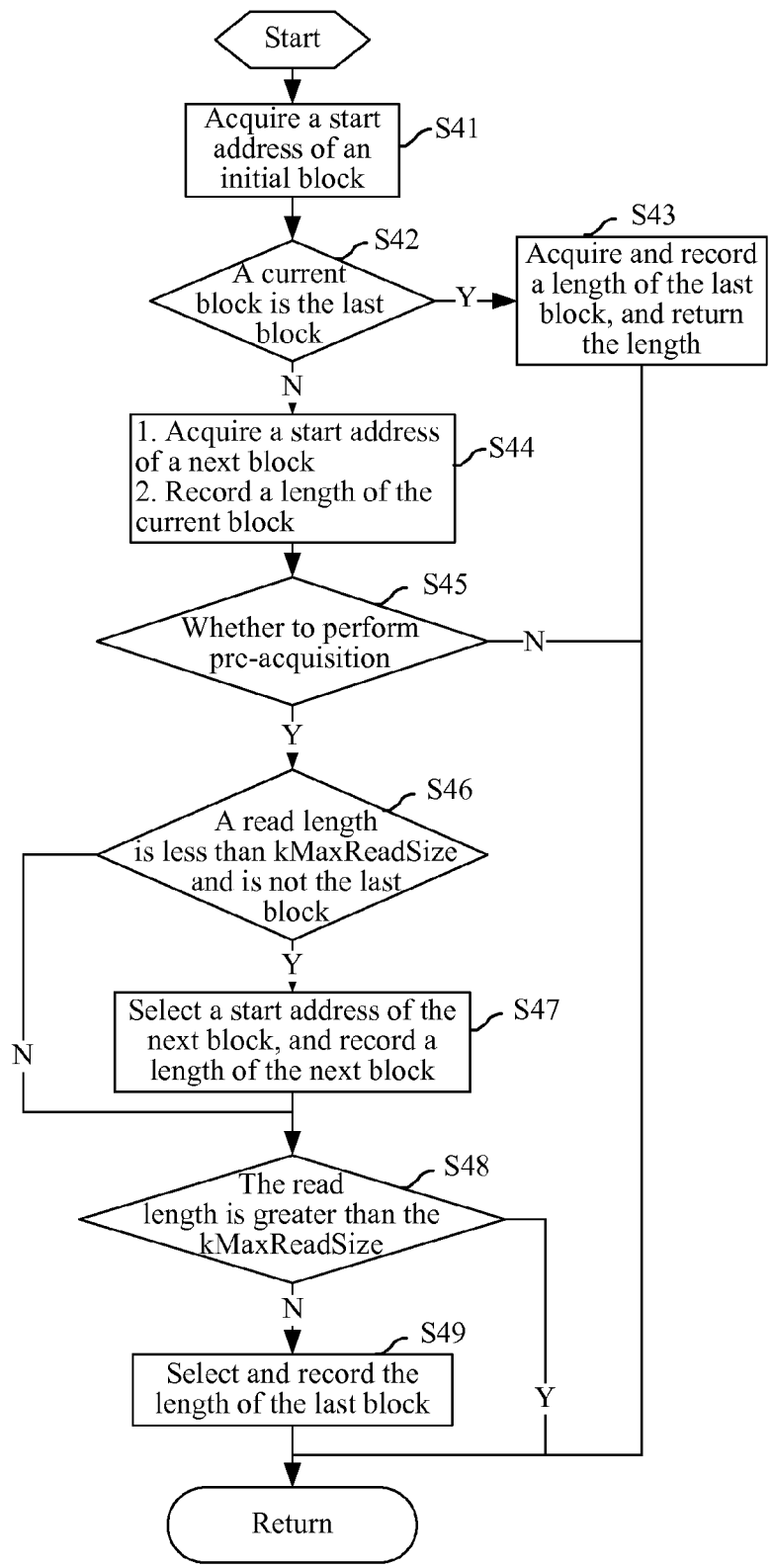
FIG. 13 is a schematic diagram of a record reading process according to an embodiment of the present invention.

FIG. 13 is a schematic diagram of a record reading process according to an embodiment of the present invention. In the record data reading process shown in FIG. 13, the method may include the following steps:

Step S41: Acquire a start address of a start data block.

Step S42: Determine whether a current data block is the last block; if the current data block is the last block, perform step S43 and subsequent steps; otherwise, perform step S44 and subsequent steps.

Step S43: Acquire and record a length of the last data block, return the length, and exit this process.

Step S44: Acquire a start address of a next data block and the length of the current data block.

Step S45: Determine whether a pre-acquisition operation is executed; if the pre-acquisition operation is not executed, exit this process; if the pre-acquisition operation is executed, perform step S46 and subsequent steps.

Step S46: Determine whether a read length is less than a maximum read size (KMaxReadSize) and is not the last data block; if the read length is less than the maximum read size and is not the last data block, perform step S47 and subsequent steps; otherwise, perform step S48 and subsequent steps.

Step S47: Acquire a start address of a still next data block, and record a length of the next data block.

Step S48: Determine whether a read length is greater than or equal to the maximum read size (KMaxReadSize); if yes, exit this process; if not, perform step S49.

Step S49: Acquire and record a length of the last data block.

Based on the foregoing detailed analysis, an implementation manner of the present invention further provides an apparatus for storing data based on key sequencing.

Figure 14:
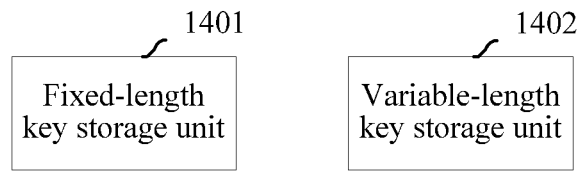
FIG. 14 is a structural diagram of a data storage apparatus according to an embodiment of the present invention.

FIG. 14 is a schematic diagram of a data storage apparatus according to an embodiment of the present invention. As shown in FIG. 14, the apparatus includes a fixed-length key storage unit 1401 and a variable-length key storage unit 1402.

The fixed-length key storage unit 1401 is configured to store a fixed-length key and a value thereof into a first data block, where the storing a fixed-length key includes: uniformly storing a common prefix of each fixed-length key, and separately storing a remainder part of each fixed-length key after the common prefix is removed.

The variable-length key storage unit 1402 is configured to store a variable-length key and a value thereof into a second data block, where the storing a variable-length key includes: storing a variable-length key of a base-key type in a full storage manner, and performing prefix compression on a variable-length key of a prefix-compressed key type.

Figure 15:
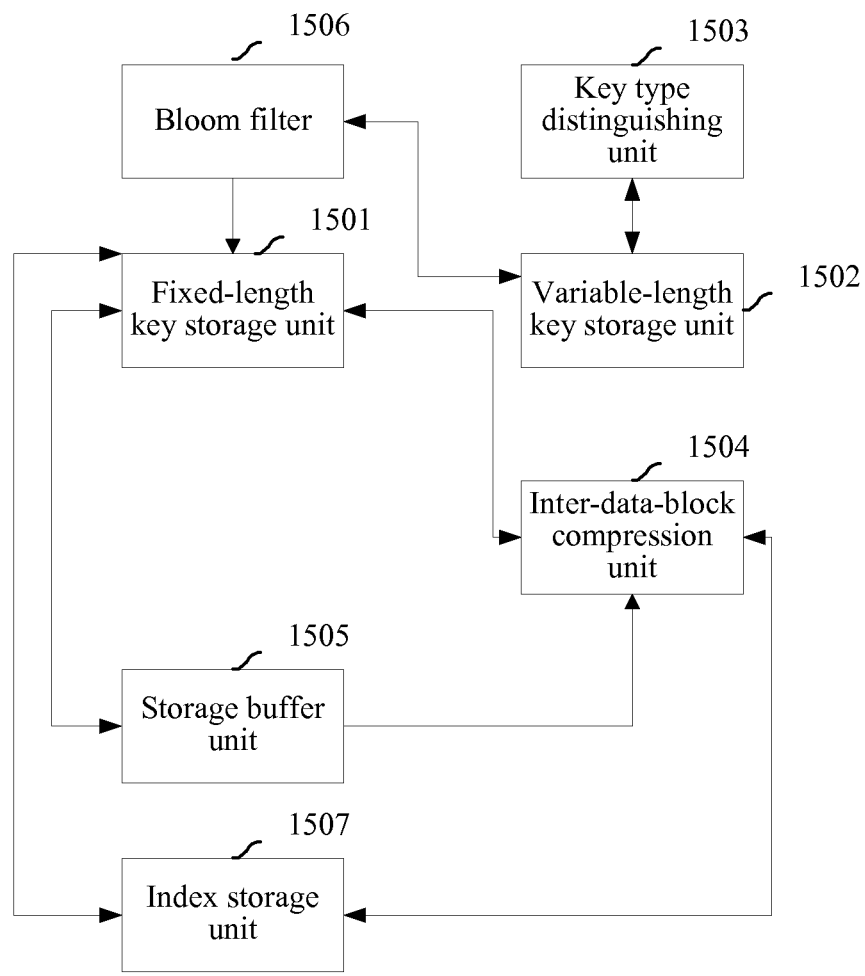
FIG. 15 is a structural diagram of a data storage apparatus according to an embodiment of the present invention.

FIG. 15 is a schematic diagram of a data storage apparatus according to an embodiment of the present invention. As shown in FIG. 15, the apparatus includes a fixed-length key storage unit 1501 and a variable-length key storage unit 1502, where functions thereof are similar to functions of the fixed-length key storage unit 1401 and the variable-length key storage unit 1402 that are shown in FIG. 14.

In an example, the apparatus may further include a key type distinguishing unit 1503.

The key type distinguishing unit 1503 is configured to group variable-length keys into a base-key type and a prefix-compressed key type according to a preset threshold length and threshold difference; compare a prefix of a current variable-length key with a prefix of a previous base key; if a length of a same prefix string is less than the threshold length, determine that the current variable-length key is the base-key type; compare the prefix of the current variable-length key with the prefix of the previous base key; if the length of the same prefix string is greater than a sum of the threshold length and the threshold difference, determine that the current variable-length key is the base-key type; compare the prefix of the current variable-length key with the prefix of the previous base key; and if the length of the same prefix string is greater than the threshold length and is less than a sum of the threshold length and the threshold difference, determine that the current variable-length key is the prefix-compressed key type.

In an example, the variable-length key storage unit 1502 is configured to: for a variable-length key of a prefix-compressed key type, store a length of a common prefix of the variable-length key of the prefix-compressed key type and a previous base key, and store a remainder part of the variable-length key of the prefix-compressed key type after the common prefix is removed.

In an example, the apparatus may further include an inter-data-block compression unit 1504.

The inter-data-block compression unit 1504 is configured to: when it is determined that the fixed-length key and the value thereof fail to be stored into the first data block, compress the first data block; and when it is determined that the variable-length key and the value thereof fail to be stored into the second data block, compress the second data block.

In an example, the apparatus may further include a storage buffer unit 1505.

The storage buffer unit 1505 is configured to allocate a storage buffer area; when a size of the compressed first data block is less than a size of the storage buffer area, write the compressed first data block into the storage buffer area; and when a size of the compressed second data block is less than the size of the storage buffer area, write the compressed second data block into the storage buffer area.

In an example, the apparatus may further include a bloom filter 1506.

The bloom filter 1506 is configured to: when it is determined that the fixed-length key and the value thereof are successfully stored into the first data block, write bloom filter information of the fixed-length key and the value thereof into the first data block; and when it is determined that the variable-length key and the value thereof are successfully stored into the second data block, write bloom filter information of the fixed-length key and the value thereof into the second data block.

In an example, the apparatus may further include a read buffer unit 1507.

The read buffer unit 1507 is configured to set a read buffer area; and when it is determined that a read length of a read operation is less than a length of the buffer area and a current data block is not the last data block, take out a start address of a next data block, record a length of the next data block, and continue reading until the read length is greater than the length of the buffer area.

In an example, the apparatus may further include a data block index storage unit 1508.

The data block index storage unit 1508 is configured to store full keys of the last cells of the first data block and the second data block, and store offsets of the first data block and the second data block in the data storage file and a length of a current row key.

In an example, the apparatus may further include a key type distinguishing unit.

In an example, the key type distinguishing unit is configured to compare a prefix of a current variable-length key and a prefix of a current base key; if a length of a same prefix string is less than the threshold length, determine that the current variable-length key is the base-key type; and if the length of the same prefix string is greater than or equal to the threshold length, determine that the current variable-length key is the prefix-compressed key type.

In an example, the key type distinguishing unit is configured to compare a prefix of a current variable-length key with a prefix of a previous key stored in the second data block; if a length of a same prefix string is greater than or equal to the sum of the threshold length and the threshold difference, determine that the current variable-length key is the base-key type; and if the length of the same prefix string is less than the sum of the threshold length and the threshold difference, determine that the current variable-length key is the prefix-compressed key type.

In an example, the key type distinguishing unit is configured to acquire a first length of a same prefix string of the current variable-length key and the previous key that is stored in the second data block; acquire a second length of a same prefix string of the current variable-length key and the current base key; if the first length is greater than or equal to a sum of the second length and the threshold difference, determine that the current variable-length key is the base-key type; and if the first length is less than the sum of the second length and the threshold difference, determine that the current variable-length key is the prefix-compressed key type.

In an example, the variable-length key storage unit is configured to: for a variable-length key of a prefix-compressed key type, store a length of a common prefix of the variable-length key of the prefix-compressed key type and a current base key, and store a remainder part of the variable-length key of the prefix-compressed key type after the common prefix is removed.

In an example, the apparatus may further include a data block index storage unit.

The data block index storage unit is configured to: when the first data block is stored into a file, store information about a location of the first data block in the file into an index block; when the second data block is stored into the file, store information about a location of the second data block in the file into an index block; and store the index blocks into the file.

In an example, the apparatus may further include a bloom filter.

The bloom filter is configured to: when it is determined that the fixed-length key and the value thereof are successfully stored into the first data block, write bloom filter information of the fixed-length key and the value thereof into the bloom filter; when it is determined that the variable-length key and the value thereof are successfully stored into the second data block, write bloom filter information of the fixed-length key and the value thereof into the bloom filter; and store the bloom filter into the file.

In an example, the apparatus may further include an inter-data-block compression unit.

The inter-data-block compression unit is configured to compress the first data block or second data block, and store the compressed first data block or second data block into a file.

In an example, the apparatus may further include a value compression unit.

The value compression unit is configured to compress the value corresponding to the fixed-length key, and provide the compressed value to the fixed-length key storage unit, so as to be stored into the first data block; and compress the value corresponding to the second data block, and provide the compressed value to the variable-length key storage unit, so as to be stored into the second data block.

In an example, the fixed-length key storage unit is configured to store the fixed-length key and the value thereof into the first data block according to a sequence that is obtained after sequencing is performed according to the fixed-length key.

The data block index storage unit is configured to store the last fixed-length key stored in the first data block and a start location and a length of the first data block in the file into the index block.

The variable-length key storage unit is configured to store the variable-length key and the value thereof into the second data block according to a sequence that is obtained after sequencing is performed according to the variable-length key.

The data block index storage unit is configured to store the last variable-length key stored in the second data block and a start location and a length of the second data block in the file into the index block.

The apparatus shown in FIG. 14 may be integrated into a hardware entity of various communications networks.

Actually, the apparatus for storing data based on key sequencing provided in this implementation manner of the present invention may be specifically implemented by using various forms. For example, the apparatus for storing data based on key sequencing is compiled into a plug-in program in a storage server according to a certain application program interface, or may also be encapsulated into an application program for downloading of a user. When a plug-in program is compiled for the apparatus, the plug-in program may be implemented in various forms of plug-ins such as ocx, dll, and cab. The apparatus for storing data based on key sequencing in this embodiment of the present invention may also be implemented by using specific technologies such as a Flash plug-in, a RealPlayer plug-in, an MMS plug-in, an MI staff plug-in, and an ActiveX plug-in The method for storing data based on key sequencing provided in this embodiment of the present invention may be stored in various storage mediums in a form of an instruction or an instruction set. These storage mediums include but are not limited to a floppy disk, an optical disc, a DVD, a hard disk, a flash memory, a USB flash drive, a CF card, an SD card, an MMC card, an SM card, a memory stick, and an xD card.

Besides, the method for storing data based on key sequencing provided in this embodiment of the present invention may be applied to a storage medium based on a flash memory (Nand flash), such as a USB flash drive, a CF card, an SD card, an SDHC card, an MMC card, an SM card, a memory stick, or an xD card.

To sum up, in the implementation manners of the present invention, a fixed-length key and a value thereof are stored into a first data block, where the storing a fixed-length key includes: uniformly storing a common prefix of each fixed-length key, and separately storing a remainder part of each fixed-length key after the common prefix is removed; and a variable-length key and a length thereof are stored into a second data block, where the storing a variable-length key includes: storing a variable-length key of a base-key type in a full storage manner, and performing prefix compression on a variable-length key of a prefix-compressed key type. As can be seen, after the implementation manners of the present invention are used, a prefix compression manner is used in a variable-length key data block, and each data block is preferably compressed; therefore, storage space of data can be effectively reduced, and disk utilization of a machine can be improved.

In addition, differing from the existing technology in which a key is used as a unit for storage, in this implementation manner of the present invention, a data block is used as a unit for storage, which facilitates IO and parsing dimensions.

In addition, in this implementation manner of the present invention, during data reading, to-be-searched data can be quickly positioned according to an index block and a sequence in the data block, thereby improving the search efficiency.

It should be noted that, in the foregoing flowcharts and structural diagrams, not all steps and modules are necessary, and some steps or modules may be ignored according to actual needs. An execution sequence of steps is not fixed, and may be adjusted according to needs. Division of modules is only for the convenience of division of functions used in the description. During actual implementation, one module may be implemented by using multiple modules, and functions of multiple modules may be implemented by using one module. These modules may be located in a same device, or may also be located in different devices.

Hardware modules in each embodiment may be implemented in a mechanical manner or an electronic manner. For example, one hardware module may include a dedicated persistent circuit or logical device (for example, a dedicated processor, such as FPGA or an ASIC), configured to implement specific operations. The hardware module may further include a programmable logical device or circuit (for example, including a general processor or another programmable processor) that is temporarily configured by software and is configured to perform specific operations. Whether to use a mechanical manner, or use a dedicated persistent circuit, or use a temporarily-configured circuit to implement the hardware module is determined according to consideration of costs and time.

The present disclosure further provides a machine readable storage medium, configured to store an instruction used for enabling a machine to perform the method described in this specification. Specifically, a system or an apparatus provided with a storage medium may be provided. The storage medium stores software program code implementing functions of any embodiment of the foregoing embodiments, to enable a computer (or a CPU or an MPU) having the system or the apparatus to read and execute the program code stored in the storage medium. In addition, the instruction based on the foregoing program code may be used to enable the operating system on the computer to complete some or all of the actual operations. The program code read from the storage medium may be written into a memory set in an extension board inserted into the computer, or written into a memory set in an extension unit connected to the computer. Subsequently, the instruction based on the program code enables a CPU installed in the extension board or the extension unit to perform some or all of the actual operations, so as to implement functions of any embodiment of the foregoing embodiments.

In this embodiment, the storage medium used for providing a program code includes a floppy disk, a hard disk, a magnetic disk, an optical disc (such as a CD-RON, CD-R, CD-RW, DVD-ROM, DVD-RAM, DVD-RW, and DVD+RW), a magnetic tape, a non-volatile storage card, and a ROM. Selectively, program code may be downloaded from a server computer through a communications network.

To sum up, the scope of the claims shall not be limited to the implementation manner of the examples described above. Instead, the specification shall be used as an entirety, and the widest explanation shall be given thereto.

What is claimed is:

1. A data storage method, comprising:
storing a fixed-length key and a value thereof into a first data block, the storing a fixed-length key comprising: uniformly storing a common prefix of each fixed-length key, and separately storing a remainder part of each fixed-length key after the common prefix is removed; and
storing a variable-length key and a value thereof into a second data block, the storing a variable-length key comprising: storing a variable-length key of a base-key type in a full storage manner, and performing prefix compression on a variable-length key of a prefix-compressed key type;
wherein the performing prefix compression on a variable-length key of a prefix-compressed key type comprises:
for the variable-length key of the prefix-compressed key type, storing a length of a common prefix of the variable-length key of the prefix-compressed key type and a current base key, and storing a remainder part of the variable-length key of the prefix-compressed key type after the common prefix is removed.

2. The data storage method according to claim 1, further comprising:
comparing a prefix of a current variable-length key and a prefix of a current base key; if a length of a same prefix string is less than a threshold length, determining that the current variable-length key is a base-key type; and if the length of the same prefix string is greater than or equal to the threshold length, determining that the current variable-length key is a prefix-compressed key type.

3. The data storage method according to claim 1, further comprising:
comparing a prefix of a current variable-length key with a prefix of a previous key stored in the second data block; if a length of a same prefix string is greater than or equal to a sum of a threshold length and a threshold difference, determining that the current variable-length key is a base-key type; and if the length of the same prefix string is less than the sum of the threshold length and the threshold difference, determining that the current variable-length key is a prefix-compressed key type.

4. The data storage method according to claim 1, further comprising:
acquiring a first length of a same prefix string of a current variable-length key and a previous key that is stored in the second data block; acquiring a second length of a same prefix string of the current variable-length key and a current base key; if the first length is greater than or equal to a sum of the second length and a threshold difference, determining that the current variable-length key is a base-key type; and if the first length is less than the sum of the second length and the threshold difference, determining that the current variable-length key is a prefix-compressed key type.

5. The data storage method according to claim 1, further comprising:
when the first data block is stored into a file, storing information about a location of the first data block in the file into an index block;
when the second data block is stored into the file, storing information about a location of the second data block in the file into an index block; and
storing the index blocks into the file.

6. The data storage method according to claim 1, further comprising:
when it is determined that the fixed-length key and the value thereof are successfully stored into the first data block, writing bloom filter information of the fixed-length key and the value thereof into a bloom filter;
when it is determined that the variable-length key and the value thereof are successfully stored into the second data block, writing bloom filter information of the fixed-length key and the value thereof into the bloom filter; and
storing the bloom filter into the file.

7. The data storage method according to claim 1, further comprising:
compressing the first data block or second data block, and storing the compressed first data block or second data block into a file.

8. The data storage method according to claim 1, wherein
the storing a fixed-length key and a value thereof into a first data block comprises: compressing the value, and storing the compressed value; and
the storing a variable-length key and a value thereof into a second data block comprises: compressing the value, and storing the compressed value.

9. The data storage method according to claim 5, wherein
the storing a fixed-length key and a value thereof into a first data block comprises: storing the fixed-length key and the value thereof into the first data block according to a sequence that is obtained after sequencing is performed according to the fixed-length key;
the storing information about a location of the first data block in the file into an index block comprises: storing the last fixed-length key stored in the first data block and a start location and a length of the first data block in the file into the index block;
the storing a variable-length key and a value thereof into a second data block comprises: storing the variable-length key and the value thereof into the second data block according to a sequence that is obtained after sequencing is performed according to the variable-length key; and
the storing information about a location of the second data block in the file into an index block comprises: storing the last variable-length key stored in the second data block and a start location and a length of the second data block in the file into the index block.

10. A data storage apparatus, comprising a fixed-length key storage unit and a variable-length key storage unit,
the fixed-length key storage unit being configured to store a fixed-length key and a value thereof into a first data block, the storing a fixed-length key comprising: uniformly storing a common prefix of each fixed-length key, and separately storing a remainder part of each fixed-length key after the common prefix is removed; and
the variable-length key storage unit being configured to store a variable-length key and a value thereof into a second data block, the storing a variable-length key comprising: storing a variable-length key of a base-key type in a full storage manner, and performing prefix compression on a variable-length key of a prefix-compressed key type;
wherein the variable-length key storage unit is configured to: for a variable-length key of a prefix-compressed key type, store a length of a common prefix of the variable-length key of the prefix-compressed key type and a current base key, and store a remainder part of the variable-length key of the prefix-compressed key type after the common prefix is removed.

11. The data storage apparatus according to claim 10, further comprising a key type distinguishing unit, wherein
the key type distinguishing unit is configured to compare a prefix of a current variable-length key and a prefix of a current base key; if a length of a same prefix string is less than a threshold length, determine that the current variable-length key is a base-key type; and if the length of the same prefix string is greater than or equal to the threshold length, determine that the current variable-length key is a prefix-compressed key type.

12. The data storage apparatus according to claim 10, further comprising a key type distinguishing unit, wherein
the key type distinguishing unit is configured to compare a prefix of a current variable-length key with a prefix of a previous key stored in the second data block; if a length of a same prefix string is greater than or equal to a sum of a threshold length and a threshold difference, determine that the current variable-length key is a base-key type; and if the length of the same prefix string is less than the sum of the threshold length and the threshold difference, determine that the current variable-length key is a prefix-compressed key type.

13. The data storage apparatus according to claim 10, further comprising a key type distinguishing unit, wherein
the key type distinguishing unit is configured to acquire a first length of a same prefix string of a current variable-length key and a previous key that is stored in the second data block; acquire a second length of a same prefix string of the current variable-length key and a current base key; if the first length is greater than or equal to a sum of the second length and a threshold difference, determine that the current variable-length key is a base-key type; and if the first length is less than the sum of the second length and the threshold difference, determine that the current variable-length key is a prefix-compressed key type.

14. The data storage apparatus according to claim 10, further comprising a data block index storage unit, wherein
the data block index storage unit is configured to: when the first data block is stored into a file, store information about a location of the first data block in the file into an index block; when the second data block is stored into the file, store information about a location of the second data block in the file into an index block; and store the index blocks into the file.

15. The data storage apparatus according to claim 10, further comprising a bloom filter, wherein
the bloom filter is configured to: when it is determined that the fixed-length key and the value thereof are successfully stored into the first data block, write bloom filter information of the fixed-length key and the value thereof into the bloom filter; when it is determined that the variable-length key and the value thereof are successfully stored into the second data block, write bloom filter information of the fixed-length key and the value thereof into the bloom filter; and store the bloom filter into the file.

16. The data storage apparatus according to claim 10, further comprising a inter-data-block compression unit, wherein
the inter-data-block compression unit is configured to compress the first data block or second data block, and store the compressed first data block or second data block into a file.

17. The data storage apparatus according to claim 10, further comprising a value compression unit, wherein
the value compression unit is configured to compress the value corresponding to the fixed-length key, and provide the compressed value to the fixed-length key storage unit, so as to be stored into the first data block; and compress the value corresponding to the second data block, and provide the compressed value to the variable-length key storage unit, so as to be stored into the second data block.

18. The data storage apparatus according to claim 14, wherein
the fixed-length key storage unit is configured to store the fixed-length key and the value thereof into the first data block according to a sequence that is obtained after sequencing is performed according to the fixed-length key;
the data block index storage unit is configured to store the last fixed-length key stored in the first data block and a start location and a length of the first data block in the file into the index block;
the variable-length key storage unit is configured to store the variable-length key and the value thereof into the first data block according to a sequence that is obtained after sequencing is performed according to the variable-length key; and
the data block index storage unit is configured to store the last variable-length key stored in the second data block and a start location and a length of the second data block in the file into the index block.

* * * * *